(12) United States Patent
Xiang et al.

(10) Patent No.: US 10,547,681 B2
(45) Date of Patent: Jan. 28, 2020

(54) FUNCTIONAL CACHING IN ERASURE CODED STORAGE

(71) Applicants: AT&T Intellectual Property I, L.P., Atlanta, GA (US); Purdue Research Foundation, West Lafayette, IN (US); The George Washington University, Washington, DC (US)

(72) Inventors: Yu Xiang, Somerset, NJ (US); Yih-Farn Robin Chen, Bridgewater, NJ (US); Vaneet Aggarwal, West Lafayette, IN (US); Tian Lan, Washington, DC (US)

(73) Assignees: Purdue Research Foundation, West Lafayette, IN (US); AT&T Intellectual Property I, L.P., Atlanta, GA (US); The George Washington University, Washington, DC (US)

( * ) Notice: Subject to any disclaimer, the term of this patent is extended or adjusted under 35 U.S.C. 154(b) by 0 days.

(21) Appl. No.: 15/199,475

(22) Filed: Jun. 30, 2016

(65) Prior Publication Data
US 2018/0004667 A1   Jan. 4, 2018

(51) Int. Cl.
*H04L 29/08* (2006.01)

(52) U.S. Cl.
CPC .................. *H04L 67/1097* (2013.01)

(58) Field of Classification Search
CPC ........... G06F 12/0848; G06F 2212/282; G06F 3/067; G06F 3/0656; G06F 3/0643;
(Continued)

(56) References Cited

U.S. PATENT DOCUMENTS 6,148,368 A * 11/2000 DeKoning .......... G06F 12/0866
                                                        710/53
7,529,834 B1   5/2009 Birrell et al.
(Continued)

FOREIGN PATENT DOCUMENTS

WO   WO 2010/045511 A2   4/2010

OTHER PUBLICATIONS

Definition cache (computing); Rouse, Margaret; Apr. 2015; retrieved from https://searchstorage.techtarget.com/definition/cache on May 29, 2018.*

(Continued)

*Primary Examiner* — Tasnima Matin
(74) *Attorney, Agent, or Firm* — BakerHostetler

(57) ABSTRACT

Encoding a file into a plurality of chunks, wherein a subset of the plurality of chunks may be used to create a functional equivalent of the file. At least one additional chunk is created from the plurality of chunks. The at least one additional chunk is directed to be stored in a cache memory and the plurality of chunks are directed to be stored on at least one storage node. Upon demand for the file, at least one additional chunk is cased to be retrieved from the cache and at least a portion of the plurality of chunks are caused to be retrieved from the at least one storage node and the functional equivalent of the file is constructed through utilization of the at least one additional chunk and the portion of the plurality of chunks.

20 Claims, 14 Drawing Sheets

(58) Field of Classification Search
CPC ...... G06F 3/0611; G06F 12/0871; G06F 7/36; G06F 2212/311; G06F 2212/261; G06F 2212/154; G06F 2212/1024; G06F 2212/463; H04L 67/1097; Y02D 10/13
USPC .......................................................... 711/129
See application file for complete search history.

(56) References Cited

U.S. PATENT DOCUMENTS

| | | | |
|---|---|---|---|
| 7,546,342 | B2 | 6/2009 | Li et al. |
| 7,783,600 | B1 | 8/2010 | Spertus et al. |
| 7,840,680 | B2 | 11/2010 | Zuckerman et al. |
| 7,992,037 | B2 | 8/2011 | Dubnicki et al. |
| 8,090,792 | B2 | 1/2012 | Dubnicki et al. |
| 8,103,904 | B2 | 1/2012 | Hafner et al. |
| 8,132,073 | B1 | 3/2012 | Bowers et al. |
| 8,326,807 | B2 | 12/2012 | Aiyer et al. |
| 8,386,841 | B1 | 2/2013 | Renade |
| 8,458,287 | B2 | 6/2013 | Ozzie et al. |
| 8,578,205 | B2* | 11/2013 | Leggette ............ G06F 12/1425 714/1 |
| 8,706,701 | B1 | 4/2014 | Stefanov et al. |
| 8,726,129 | B1 | 5/2014 | Post |
| 8,856,593 | B2 | 10/2014 | Eckhardt et al. |
| 8,977,660 | B1 | 3/2015 | Xin et al. |
| 8,984,384 | B1 | 3/2015 | Juels et al. |
| 9,021,296 | B1 | 4/2015 | Kiselev et al. |
| 9,141,679 | B2 | 9/2015 | Gopalan et al. |
| 9,148,174 | B2 | 9/2015 | Baker et al. |
| 9,244,761 | B2 | 1/2016 | Yekhanin et al. |
| 2006/0174063 | A1* | 8/2006 | Soules ............... G06F 12/0862 711/118 |
| 2007/0177739 | A1 | 8/2007 | Ganguly et al. |
| 2008/0133766 | A1* | 6/2008 | Luo .......................... H04L 47/10 709/231 |
| 2008/0270878 | A1* | 10/2008 | He ...................... G06F 11/1076 714/805 |
| 2012/0266044 | A1 | 10/2012 | Hu et al. |
| 2013/0179490 | A1* | 7/2013 | Naga ................. G06F 17/30165 709/203 |
| 2013/0290361 | A1 | 10/2013 | Anderson et al. |
| 2014/0215543 | A1* | 7/2014 | Li ..................... H04N 21/64738 725/115 |
| 2014/0380125 | A1 | 12/2014 | Calder et al. |
| 2015/0278018 | A1* | 10/2015 | Kato ................... G06F 11/1076 714/764 |
| 2017/0083603 | A1* | 3/2017 | Minder ............. G06F 17/30598 |
| 2017/0123728 | A1* | 5/2017 | Rungta ................ G06F 3/0611 |
| 2017/0161148 | A1* | 6/2017 | Vairavanathan .... G06F 11/1435 |
| 2017/0272209 | A1* | 9/2017 | Yanovsky ............ G06F 3/0619 |

OTHER PUBLICATIONS

Greenan et al.; "A Spin-Up Saved is Energy Earned: Achieving Power-Efficient, Erasure-Coded Storage"; HotDep; 2008; 6 pages.
Khan et al.; Rethinking Erasure Codes for Cloud File Systems: Minimizing I/O for Recovery and Degraded Reads; 10th Usenix Conference on File and Storage Technologies; Feb. 14-17, 2012; 14 pages.
Sathiamoorthy et al.; "XORing Elephants: Novel Erasure Codes for Big Data"; Technical Report in Proceedings of VLDB; vol. 6 No. 5; Jan. 2013; 16 pages.
Huang et al.; "Optimizing File Retrieval in Delay-Tolerant Content Distribution Community"; 29th IEEE Int'l Conf. on Distributed Computing Systems Workshops; 2009; 9 pages.

* cited by examiner

FUNCTIONAL CACHING IN ERASURE CODED STORAGE

TECHNICAL FIELD

The technical field relates generally to storage systems and more particularly, to caching in erasure coded storage systems.

BACKGROUND

In large distributed storage systems, erasure coding has been used to minimize cost and increase reliability. Erasure coding generally is a technique by which data is broken into chunks, encoded with redundant pieces of data and stored across different nodes. If a particular chunk of data is lost, then it can be recovered by decoding the remaining chunks of data. Data intensive applications, such as big data analytics, multimedia streaming, ecommerce, and social media have benefited from the use of erasure coding.

Nevertheless, the popularity of such applications and the corresponding increase in demand has placed a burden on existing data storage systems. Simply put, the sheer amount of traffic is making it more and more difficult to transfer data from storage to end users in a timely manner. One conventional way of reducing this type of latency is through the use of caching. By storing large chunks of popular data in high speed storage and/or at locations near end-users, caching reduces congestion and decreases the time for processing file requests. However, to date, there are no efficient mechanisms for caching data that has been erasure coded. Accordingly, what is needed is a functional caching approach for erasure coded storage as set forth herein.

SUMMARY

The following presents a simplified summary that describes some aspects of the subject disclosure. This summary is not an extensive overview of the disclosure. Indeed, additional or alternative aspects and/or examples of the subject disclosure may be available beyond those described in the summary.

The disclosure includes an apparatus and system comprising a processor and a memory coupled to the processor. The memory comprises executable instructions that cause the processor to effectuate methods and operations. The operations comprise encoding a file into a plurality of chunks, wherein a subset of the plurality of chunks may be used to create a functional equivalent of file. At least one additional chunk is created from the plurality of chunks. The at least one additional chunk is directed to be stored in a cache memory and the plurality of chunks are directed to be stored on at least one storage node Upon demand for the file, at least one additional chunk is cased to be retrieved from the cache and at least a portion of the plurality of chunks are caused to be retrieved from the at least one storage node and the functional equivalent of the file is constructed through utilization of the at least one additional chunk and the portion of the plurality of chunks.

The operations may also include utilizing the plurality of chunks to create a plurality of additional chunks; and wherein the operation of directing comprises directing the plurality of additional chunks to be stored in the cache memory. The operations may also include directing each of the plurality of additional chunks to be stored in the cache memory and directing each of the plurality of chunks to be stored on one of the storage nodes. The operations may also include requesting each one of the storage nodes to transmit a respective one of the plurality of chunks. The operations may also include constructing the functional equivalent upon receipt of sufficient chunks to reconstruct the file. The operations may also include encoding the file through employment of a maximum distance separable (MDS) erasure code to create a (n, k) erasure code, wherein n is a number of chunks into which the file has been encoded and k represents a minimum number of chunks through which the file may be reconstructed. The operations max also include using the at least one additional chunk to create a (n+d, k) erasure code, wherein d represents the at least one additional chunk the operation may also include receiving a plurality of requests for the file, calculating a rate at which the plurality of requests have been received, and using the rate in a determination to crease the at least one additional chunk.

BRIEF DESCRIPTION OF THE DRAWINGS

Aspects of the herein described telecommunications network and systems and methods for antenna switching based on device position are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

The present disclosure provides functional caching approaches that enable caching to be used efficiently in erasure coded storage systems. It will be understood that this approach is described with respect to erasure coded storage systems, but the principles described herein are applicable to storage systems in general.

Figure 1:
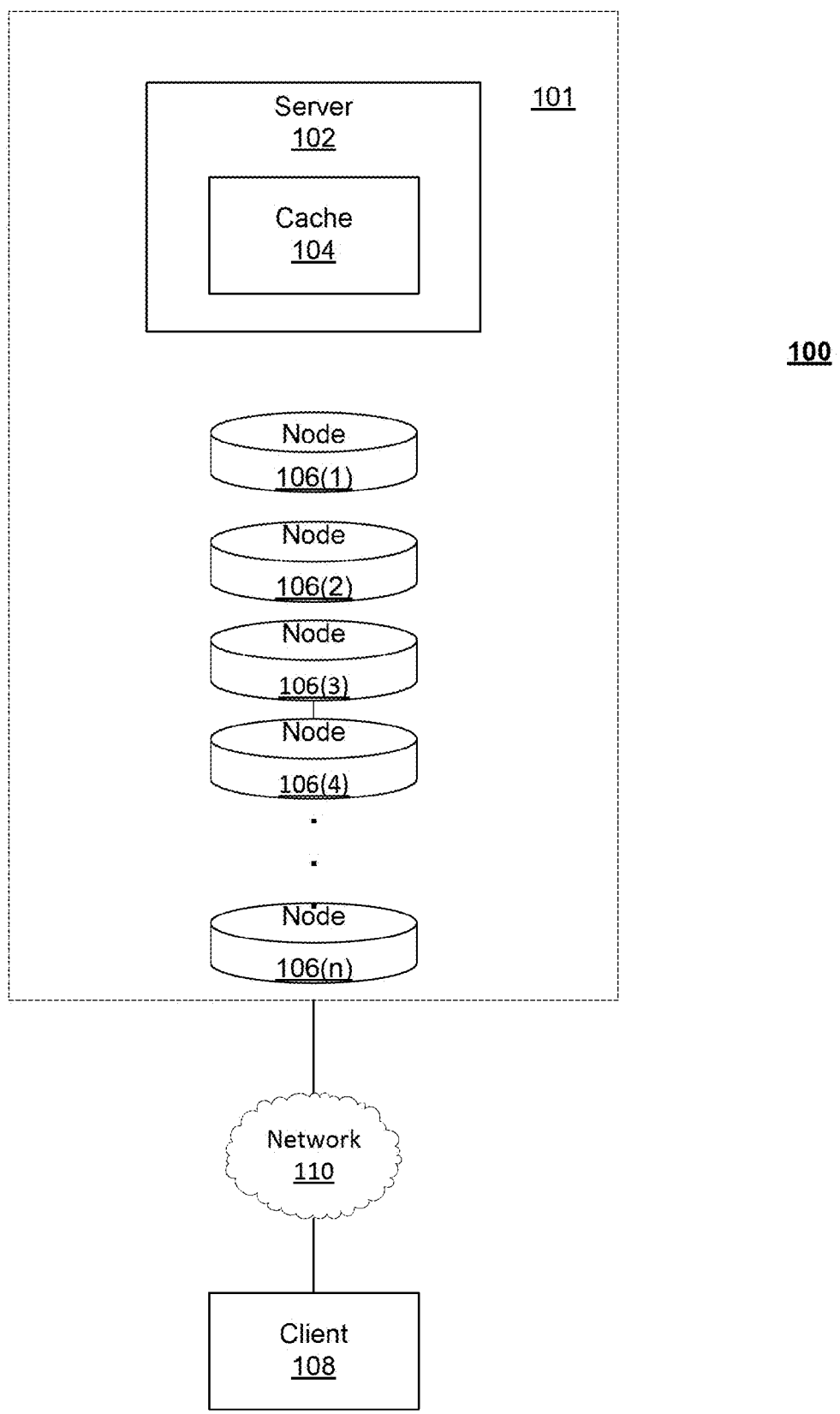
FIG. 1 is a schematic of a system including at least one instance of a data storage system in accordance with the present disclosure.

The present disclosure will describe functional caching for illustrative purposes with respect to the exemplary system 100 shown in FIG. 1. It should be understood, however, that functional caching may be used in systems having other configurations. Further, it should be understood that the system of FIG. 1 is intended to be connected to one or more consumers or users of data. Such consumers may be entities, such as individuals, business organizations, government organizations, and the like. Such consumers may be systems operated by the preceding entities. The uses of the data may be varied in application. Examples include, but are not limited to, multimedia streaming big data analytics, telecommunications, and/or social media. FIGS. 7-14 describe exemplary networks and network devices in which storage system 100 and the functional caching approaches described herein may be implemented.

Referring to FIG. 1, a system 100 in one embodiment comprises at least one instance of data storage system 101, at least one instance of client 108, and at least one network 110.

In one example, data storage system 101 comprises a cloud storage system. Although, the present application is not limited to cloud storage systems. In one embodiment, data storage system 101 includes at least one instance of server 102 (with at least one instance of cache 104), and one or more storage nodes 106(1) . . . 106(n). It should be understood that components shown in FIG. 1 are provided for illustrative purposes and should not be construed as limiting. For instance, data storage system 101 may be part of a data center that would include components that are not shown in FIG. 1, such as processing devices, communication lines, monitors, power supplies, environmental controls, and security devices. Functional caching is described herein with respect to a single data storage system. It should be understood, however, that functional caching is applicable to multiple instances of storage system 101 operating contemporaneously. Finally, it should be understood that data storage system 101 is not necessarily a self-contained unit. The components of the system 100, including data storage system 101, may be physical and/or virtual and may be functionally and/or geographically combined and/or divided as part of a distributed computing environment.

Referring further to FIG. 1, server 102 in one example provides the processing capability through which the functionality descried herein may be implemented. An exemplary server configuration may be all or a portion of the computer system 900 shown in FIG. 9. Cache 104 in one example is a storage device that provides fast access to data through enhanced capabilities, such as its processing power, construction, architecture, operation, and/or proximity to a consumer of data. It should be noted that cache 104 is shown as being a part of server 102, but alternatively cache 104 could be physically separate from server 102. For instance, cache 104 could reside on a client device 108. A storage node 106 in one example is a data storage device with one or more storage drives that are used to store data. Generally, it is understood that accessing data from storage nodes 106(1) . . . 106(n) takes longer than accessing data from cache 104. Cache 104 in one example may have less capacity than storage is nodes 106(1) . . . 106(n) although that does not have to be the case. Cache 104 in another example may have greater of equal capacity to a storage node 106. An exemplary storage node may 106 may be memory device or a communication device with storage of sufficient capacity to provide storage capabilities to clients 108. Storage node 106 may be constructed similar to all or a portion of the network device 700 of FIG. 7 and/or computer system 900 shown in FIG. 9.

Referring further to FIG. 1, in one embodiment, one or more client devices 108 interface with and exchange data with data storage system 101. Such clients 108 in one example may include network devices 700 of the kind shown in FIG. 7 or computer systems 900 shown in FIG. 9. In one example, clients 108 exchange data with data storage system 101 through one or more wireless and/or wired networks 110. In another embodiment, clients 108 may be connected directly to data storage system through, a dedicated wired and/or wireless connection.

Figure 2:
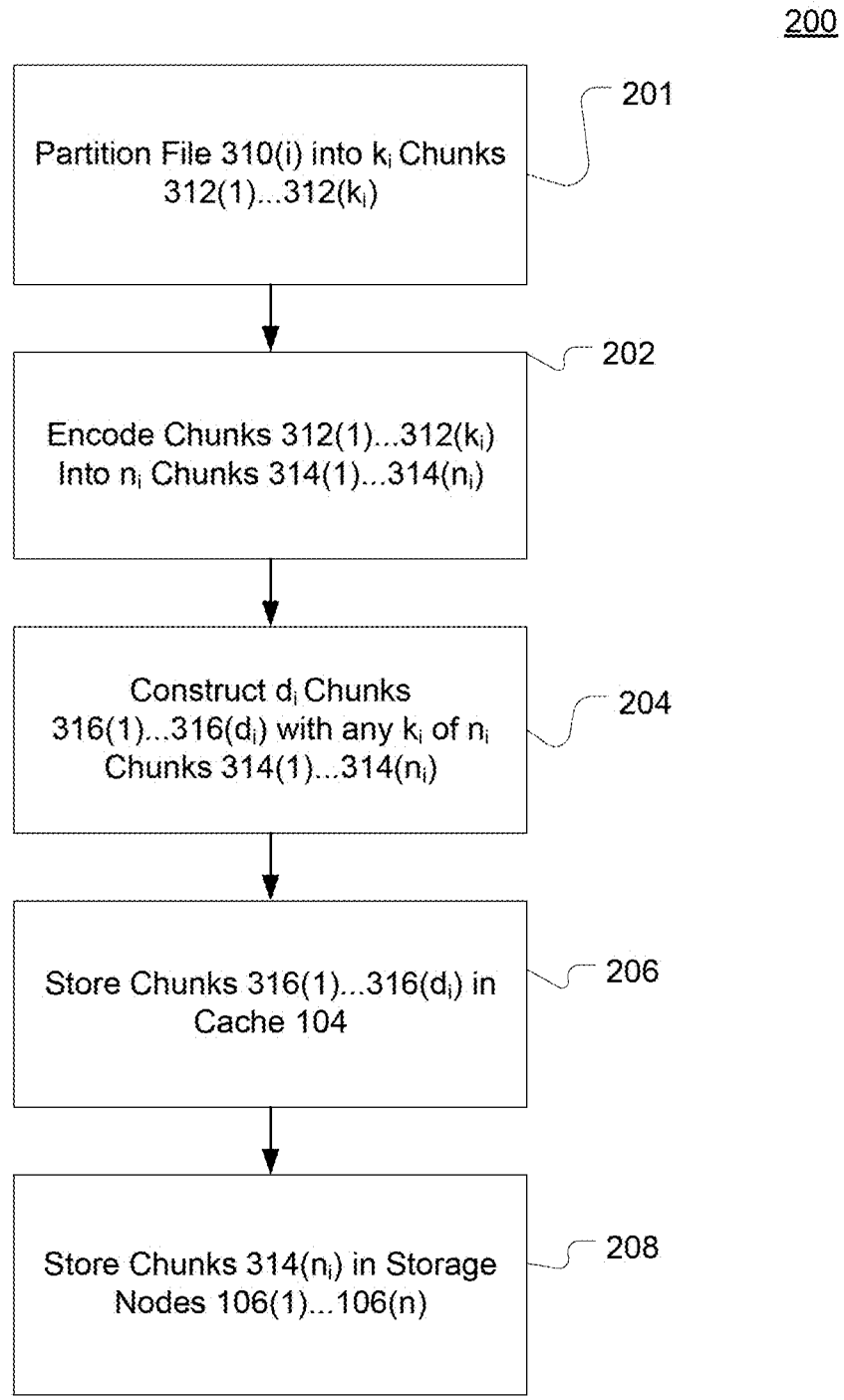
FIG. 2 illustrates an exemplary process flow for functional caching in the data storage system of FIG. 1.
Figure 3:
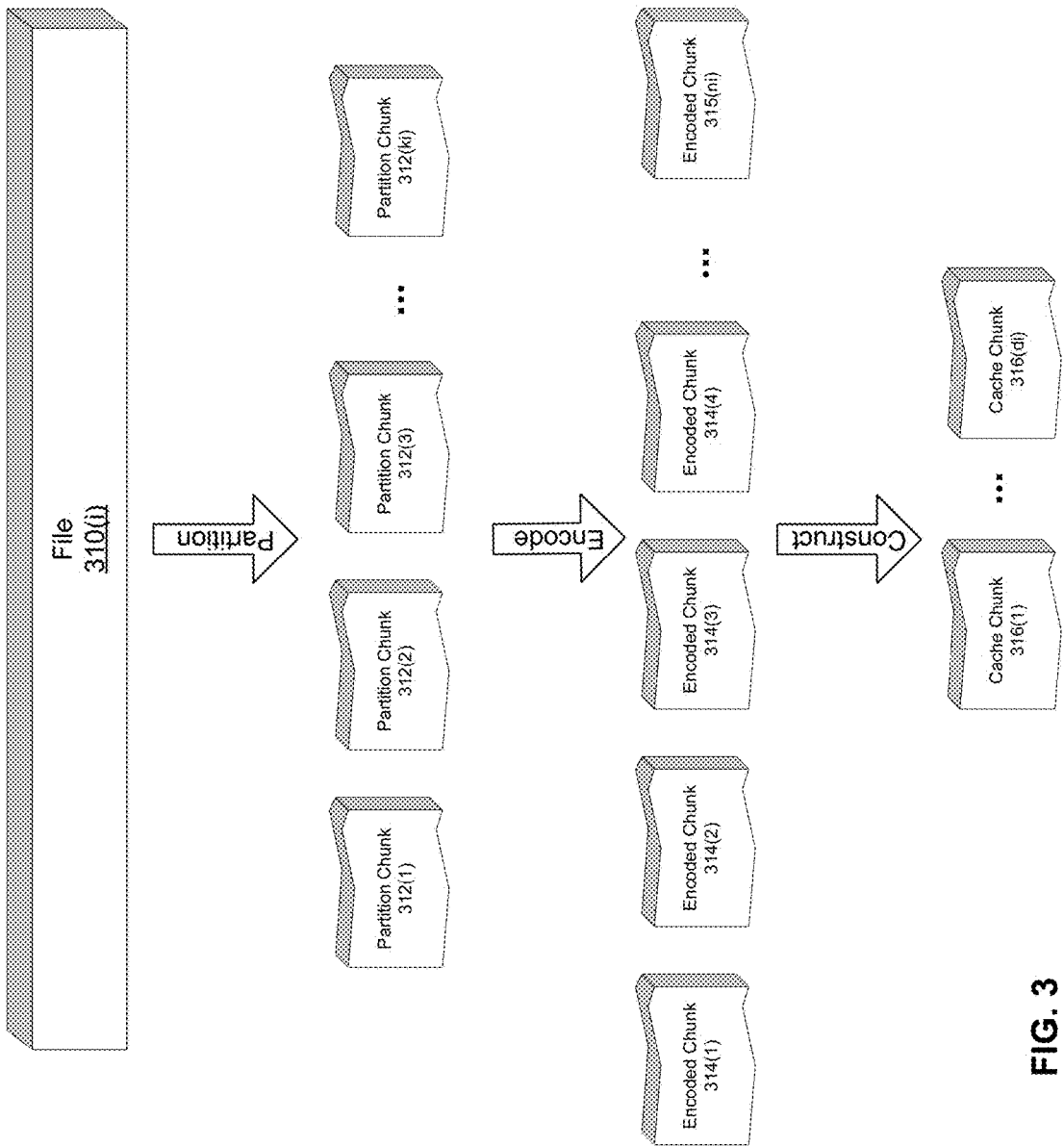
FIG. 3 depicts a graphical representation of a portion of the process flow of FIG. 2.

Referring to FIGS. 2 and 3, one example of a functional caching process 200 using data storage system 101 will now be provided for illustrative purposes. In one embodiment, one or more files 310(i) are each stored in the data storage system 100. For purposes of this description, each such file 310(i) may be represented as having an index, such as i. In one embodiment, the number of files may be defined as r. Accordingly, the index i would range from 1 . . . r.

The files 310(i) in one example contain data that one or more clients 108 desire to receive or consume. Certain files 310(i) in one example may be requested and/or received by clients 108 more often than other files. In one example, the frequency at which a file 310(i) may be received or requested by clients 108 may be referred to as the arrival rate of the file 310(i). In one example, due to a particular file 310(i) having a higher arrival rate, it may be worthwhile to decrease the time that it takes for clients 108 to access the file 310(i) through functional caching. A determination to functionally cache a file may be based on one or more criteria. For example, if a streaming service were to release a popular movie, it may elect to functionally cache the file 310(i) representing the movie in advance of its release. In another example, an entity may realize from network analytics that a particular file 310(i) is being requested at an increasing rate. Accordingly, the entity may elect to functionally cache the file 310(i) based on the analytic data.

Referring to FIG. 2, a description of an exemplary process 200 of functional caching will now be described for illustrative purposes. The process will be described with reference to FIG. 3, which depicts a file 310(i). It is assumed for illustrative purposes that a decision has been made, according to some criteria, to cache file 310(i).

Referring now to FIGS. 2 and 3, in step 201, server 102 partitions file 310(i) into $k_i$ chunks 312(1) . . . 312($k_i$). In one example, chunks 312($k_i$) are of equal size. In another example, chunks 312(1) . . . 312($k_i$) may be of variable sizes. Further, the size of $k_i$ may vary by file 310(i). For instances a first file 310(r) may have $k_r$ equal to one number whereas another file 310(r−1) may have a $k_{r-1}$ less than or greater to $k_r$.

In step 202, chunks 312(1) . . . 312($k_i$) are encoded to create encoded chunks 314(1) . . . 314($n_i$). In one embodiment, chunks 312(1) . . . 312($k_i$) are encoded using an ($n_i$, $k_i$) erasure code to create n encoded chunks 314(1) . . . 314($n_i$). Accordingly, the file 310(i) may be reconstructed through any subset $k_i$ of the $n_i$ encoded chunks 314($n_i$). For example, consider a file 310(i) that is linearly encoded using a (5, 4) MDS code in which n=4 and k=5. In step 202, the file is partitioned into 4 chunks 312(1) . . . 312(4), which will be denoted below by $A_1$, $A_2$, $A_3$, and $A_4$, respectively. In one example, the chunks 312(1) . . . 312(4) are linearly encoded to generate 5 encoded chunks 314(1) . . . 314(5), which will be denoted below by $F_1$, $F_2$, $F_3$, $F_4$, and $F_5$, respectively. After linear encoding, the chunks bear the following relation:

$$F_1 = A_1$$

$$F_2 = A_2$$

$$F_3 = A_3$$

$$F_4 = A_4$$

$$F_5 = A_1 + A_1 + A_1 + A_1.$$

Thus, to reconstruct file 310(i), the server 102 must retrieve $F_1$, $F_2$, $F_3$, and $F_4$, or three of $F_1$, $F_2$, $F_3$, and $F_4$ in addition to $F_5$.

Referring further to FIG. 2, in step 204, $d_i$ additional chunks 316(1) ... 316($d_i$) are constructed from encoded chunks 314(1) ... 314($n_i$). In one embodiment, $d_i$ additional chunks 316(1) ... 316($d_i$) may be created from any $k_i$ of chunks 314(1) ... 314($n_i$). It should be noted that di in one example may range from 0 ... $k_i$, but for illustrative purposes, in the preceding example, we will set $d_i$ as equal to 2, in which case there are 2 additional chunks 316(1) and 316(2), which will be denoted as $C_1$ and $C_2$. These, in one example, bear the following relation:

$$C_1 = F_1 + 2F_2 + 3F_3 + 4F_4$$

$$C_2 = 4F_1 + 3F_2 + 2F_3 + F_4$$

Thus, to reconstruct file 310(i), server 102 can retrieve four chunks from the group of encoded chunks 314(1) ... 314($n_i$) and chunks 316(1) ... 316($d_i$). However, as was noted for a large enough $d_i$, server 102 could retrieve chunks 316($d_i$) and create a functional equivalent of file 310(i). It should be noted that the preceding examples of the mathematical relationship between chunks 312, 314, and 316 are provided for illustrative purposes only, and other relationships and encoding are within the scope of the present disclosure.

Figure 4:
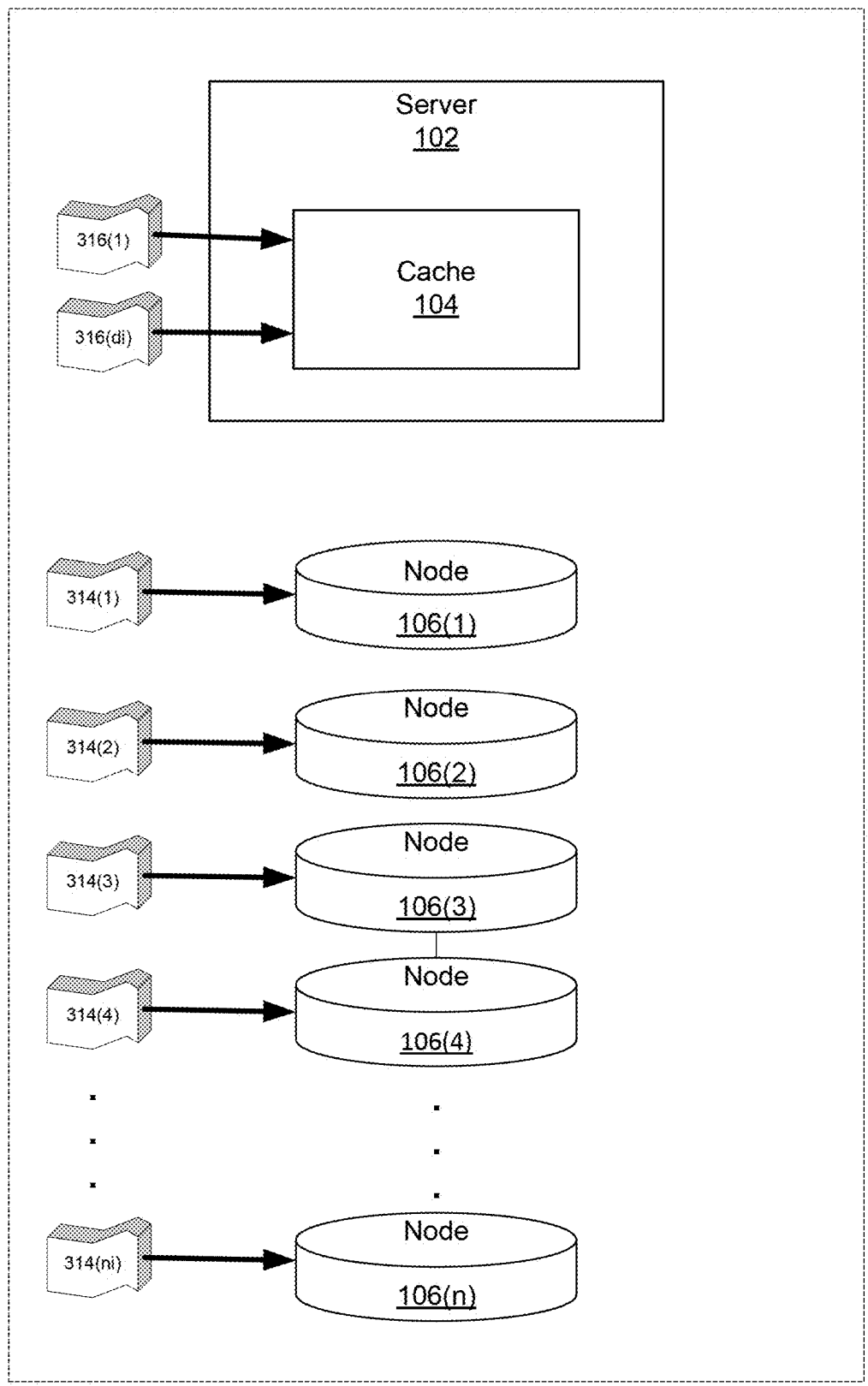
FIG. 4 depicts a graphical representation of a portion of the process flow of FIG. 2.

Referring now to FIG. 2 and FIG. 4, in step 206, server 102 directs chunks 316(1) ... 316($d_i$) to be stored in cache 104, and in step 208 directs chunks 314(1) ... 314($n_i$) to be stored in storage nodes 106(1) ... 106(n). In one example, chunks 314(1) ... 314($n_i$) may each be stored in a corresponding storage node 106(1) ... 106(n). In another example, chunks 314(1) ... 314($n_i$) may be stored on a subset of storage nodes 106(1) ... 106(n).

Therefore, to reconstruct file 310(i), server 102 causes retrieval of $d_i$ chunks from relatively high speed cache 104 and $n_i - d_i$ chunks from lower speed storage nodes 106(1) ... 106(n). It should be noted that for illustrative purposes only FIG. 4, depicts chunks 314(1) ... 314($n_i$) as each being stored on a corresponding distinct storage node 106(1) ... 106(n) to provide reliability in the event of node or network failures. In an alternative a plurality of chunks 314(1) ... 314($n_i$) may be stored on a subset of storage nodes 106(1) ... 106($n_i$).

Figure 5:
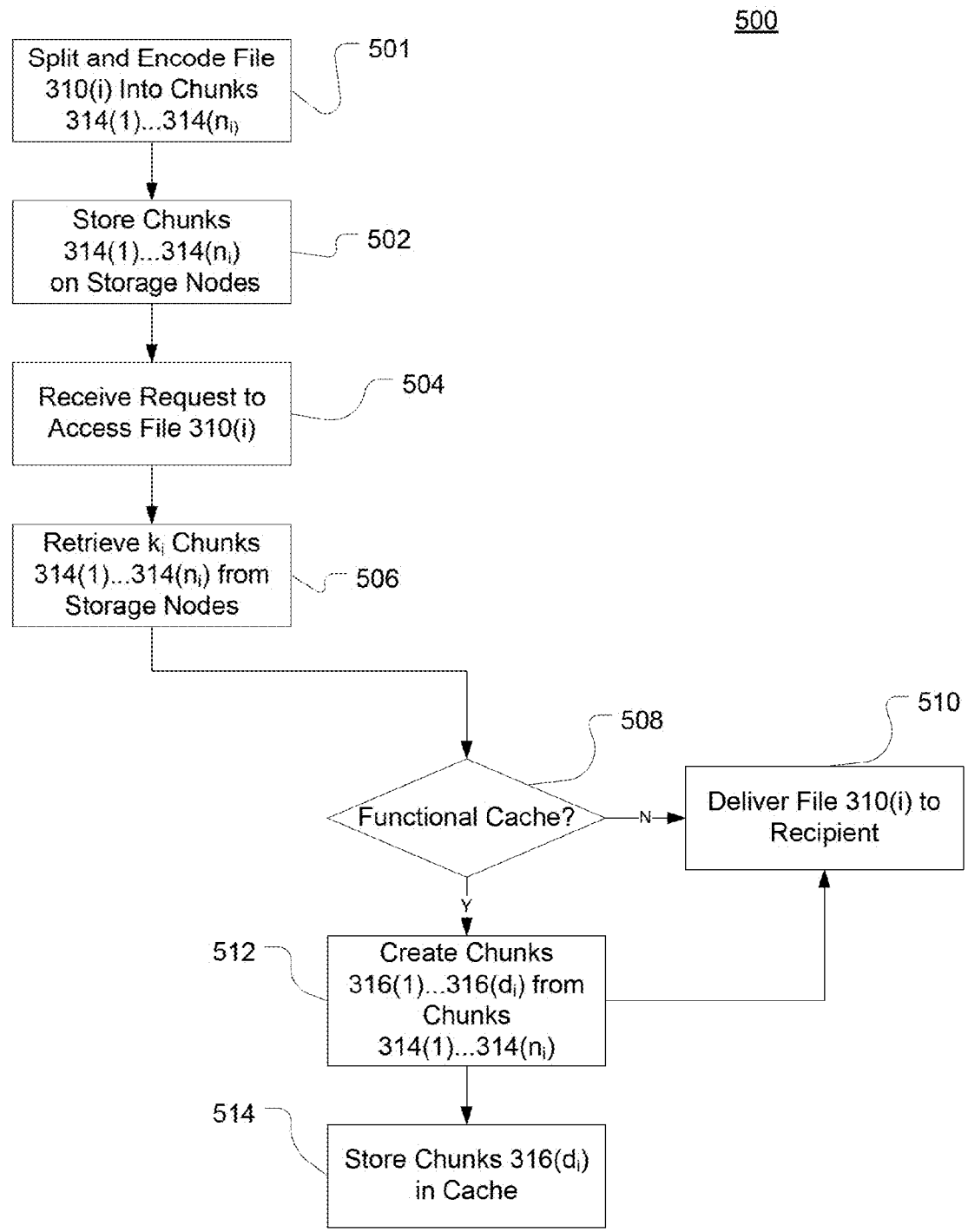
FIG. 5 illustrates a process flow for an exemplary storage process utilizing functional caching.

Referring to FIG. 5, an exemplary description of the operation 500 of system 100 is now provided for illustrative purposes.

In step 500, a file 310(i) is partitioned and encoded into chunks 314(1) ... 314($n_i$). In step 502, the chunks 314(1) ... 314($n_i$) are stored in storage nodes 106(1) ... 106($n_i$). In one example, each chunk 314(1) ... 314($n_i$) is stored on a corresponding storage node 106(1) ... 106($n_i$). In step 504, server 102 receives a request to access file 310(i). In step 506, server 102 retrieves chunks 314(1) ... 314($n_i$) from storage nodes storage node 106(1) ... 106($n_i$) or a subset of storage node 106(1) ... 106(n). In step 508, a determination is made whether or not to functionally cache file 310(i). In one embodiment, the determination is as to whether to functionally cache file 310(i) is made based on one or more criteria. For example, the frequency at which the file 310(i) is requested may determine whether to cache file 310(i). In another example, a decision may be made to cache file 310(i) based on other criteria, such as the size of the file 310(i) or the perceived popularity of the file 310(i). For instance, if storage system 101 were part of a multimedia streaming service or social media network, it may be desirable to functionally cache files 310(i) that are predicted to be popular during a certain timeframe, such as during a new release period or in accordance with trend data for a particular topic.

In step 510, if a determination is made to not functionally cache file 310(i), then file 310(1) is reconstructed from chunks 314(1) ... 314($n_i$) and sent to the client 108. If in step 508, a determination is made to functionally cache file 310(i), then in step 512, chunks 316(1) ... 316($d_i$) are created from chunks 314(1) ... 314($n_i$). File 310(i) is then sent to client 108. In step 514, chunks 316(1) ... 316($d_i$) are stored in cache 104.

Figure 6:
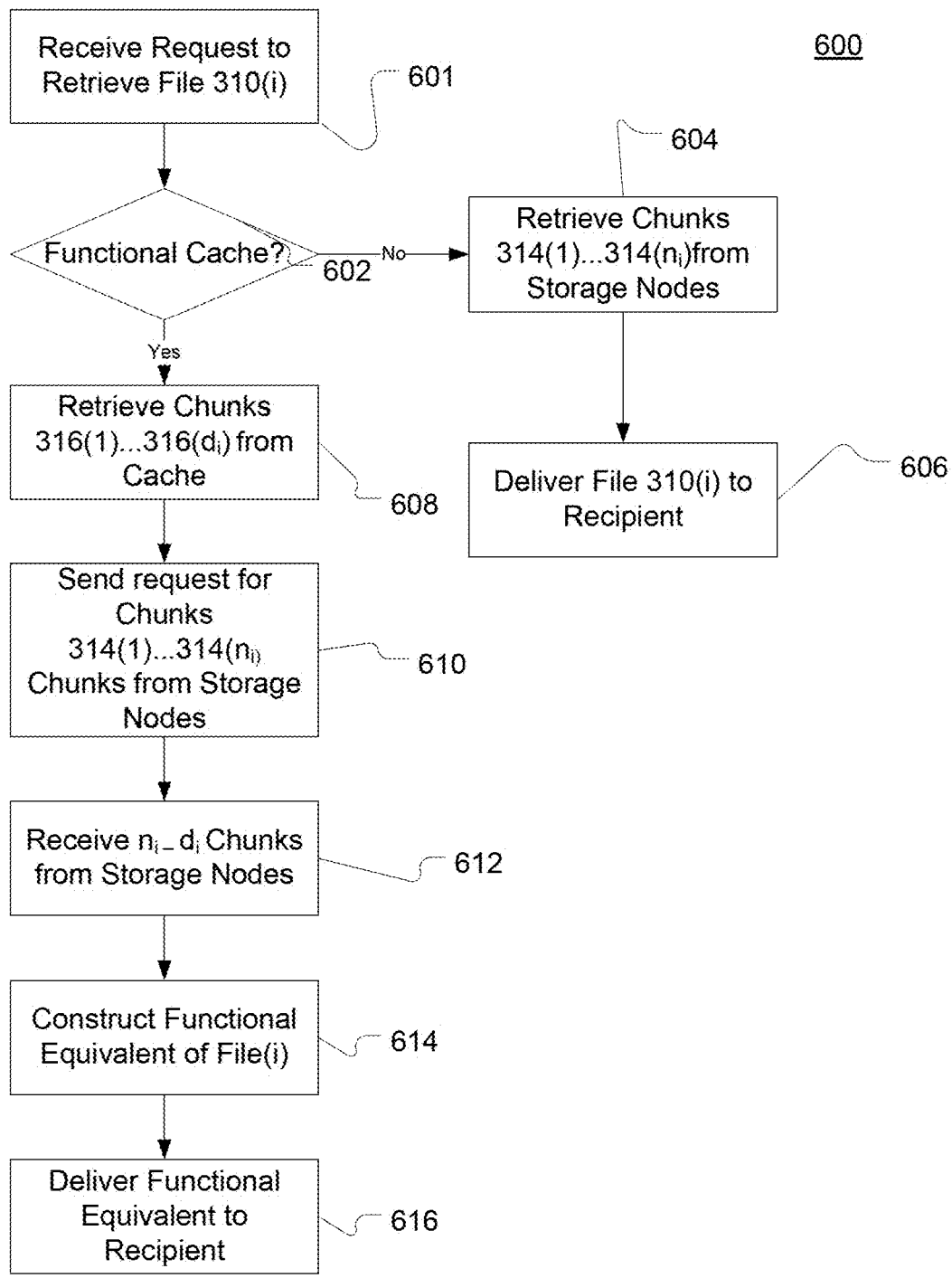
FIG. 6 illustrates a process flow for an exemplarly file retrieval process from a data storage system using functional caching in accordance with the present disclosure.

Referring to FIG. 6, a description of a process 600 for retrieving file 310(i) will now be provided for illustrative purposes. In step 601, server 102 receives a request for file 310(i). In one example, the request comes from at least one client 108. In step 602, a determination is made as to whether or not file 310(i) has been functionally cached. If file 310(i) has not been functionally cached, then in step 604, server 102 retrieves chunks 314(1) ... 314($n_i$) from storage nodes 106(1) ... 106(n). In step 606, file 310(i) is reconstructed and delivered to client 108.

In step 608, if file 310(i) has been functionally cached, then chunks 316(1) ... 316($d_i$) are retrieved from cache 104. In step 610, a request for chunks 314(1) ... 314($n_i$) are sent to storage nodes 106(1) ... 106(n). When the storage nodes 106(1) ... 106($n_i$) respond by sending chunks 314(1) ... 314($n_i$) to server 102, server 102 will be able to construct a functional equivalent of file 310(i) upon receipt of $n_i - d_i$ of chunks 314(1) ... 314($n_i$). Accordingly, in step 612, server 102 receives $n_i - d_i$ of chunks 314(1) ... 314($n_i$). In step 614, server 102 constructs a functional equivalent of file 310(i) and in step 616, the functional equivalent is sent to client 108.

It should be noted that the preceding example has been provided for illustrative purposes and it is further within the scope of the disclosure to provide a large enough cache 104 such that chunks 314(1) ... 314($n_i$) are not required to create a functional equivalent of file 310(i). For instance, $d_i$ could equal $n_i$ and cache 104 could store $n_i$ chunks 316(1) ... 316($d_i$) in cache 104 in which case no chunks from storage nodes 106(1) ... 106($n_i$) would be needed to create a functional equivalent.

The present disclosure will now describe for illustrative purposes a novel process by which a cache 104 in exemplary storage system 101 of FIG. 1 may be optimized while utilizing the functional caching approach described herein. Such a cache optimization will increase the efficient of storage system 101 and reduce latency. The cache optimization approach is provided for illustrative purposes only, and it should be understood that other cache optimization approaches are within the scope of the present disclosure.

The cache optimization approach uses a two-part process. First, system 100 operation is modeled to statistically predict the receipt of file requests. Second, an optimization scheme will be modeled such that the most efficient operation of cache will be determined in order to minimize latency of file requests. It should be noted that such cache optimization is some cases may be necessary due to limitations in cache size. Further, the optimization will be described with respect to exemplary system 100, but it should be understood that the approach is applicable to other system configurations. For example, a plurality of files 310(1) . . . 310(i) may be stored on a plurality of servers 102(i) . . . 102(j), where j is the number of servers in the system 100. Servers 102(i) . . . 102(j) may be located in the same data center. In another example, servers 102 may be located in separate data centers. The cache optimization routine will provide the output for when a particular file 310(i) is selected for a functional caching approach. For instance, if a particular file 310(i) is selected by the optimization routine for caching, then upon access, chunks 314(1) . . . 314($d_i$) will be created. The cache optimization may be run in a periodic fashion in accordance with a schedule, during times of peak demand, or in accordance with some other criteria.

In one embodiment, each server 102 has a cache 104 of a size C and is to store a limited number of chunks of the files 310(i). In another example, the servers may have varying cache 104 sizes.

File access requests in one example may be modeled by a non-homogenous Poisson process with time-scale separation, such that storage system 101 service time is divided into multiple bins, each with different request arrival rates while the arrival rates within each bin remain stationary. In one example, $\lambda_{i,j,t}$ may be used to denote the arrival rate of a file i request at a particular server j in a particular time bin t. In one example, $d_i \leq k_i$ in may be used as a parameter governing the size of each cache 104.

As discussed herein, $d_i$ chunks 316(1) . . . 316($d_i$) of file 310(i) are constructed and stored in cache 104 so that a request to access file 310(i) can be processed using chunks 316(1) . . . 316($d_i$) in conjunction with $k_i - d_i$ of chunks 314(1) . . . 314($k_i - d_i$) on a storage nodes 106(1) . . . 106($k_i - d_i$). After a file request arrives at the storage system 101, the file request in one example is treated as a batch of $k_i - d_i$ chunk requests that are forwarded to storage nodes 106(1) . . . 106($k_i - d_i$), as well as $d_i$ chunks requests that are processed by cache 104. Each storage node 106(1) . . . 106($k_i - d_i$) in one example buffers the requests in a common queue of infinite capacity and processes them in a FIFO manner. The file request is served when all $k_i$ chunk requests are processed. Further, in one embodiment, a chunk service time $X_j$ of a server j may be modeled with distributions inferred from network delay and file-size distribution statistics.

In one embodiment, the placement of a file request in a time-bin is based on the predicted arrival rates in the time bin. The time bin can either be fixed time or dynamic based on significant change of the predicted arrival rates. In one example, at the start of the time-bin t, cache 104 placement is determined using an optimized algorithm. In one embodiment, any file 310(i) that has a number of chunks below a predetermined threshold will be removed from the cache 104. For the files 310(i) for which the cache 104 contents are expected to increase in a time bin t, a decision is made to wait for the file 310(i) to be accessed. When the file 310(i) is accessed, the file chunks 314(1) . . . 314($n_i$) are generated and the chunks 316(1) . . . 316($d_i$) are generated to be placed in the cache 104. Thus, the change of cache 104 content does not cause any additional network overhead and the contents of a file 310(i) are added to the cache 104 one when the file 310(i) is first accessed in a new time bin t. In one embodiment, chunks 316(1) . . . 316($d_i$) are only removed from the cache 104 when space is needed to add new chunks 316(1) . . . 316($d_i$) in accordance with the model.

At time t, cache optimization results in an optimal number $d_{i,t}$ of chunks 316 to store in the cache 104, given a cache 104 capacity constraint $d_{i,t} \leq C$, in order to minimize mean service latency of all files 310(i). As was discussed earlier, under functional caching, each file request is served by accessing $d_{i,t}$ chunks 316(1) . . . 316($d_{i,t}$) in the cache, along with $k_i - d_{i,t}$ of chunks 314(1) . . . 314($k_i - d_{i,t}$) that are selected from $n_i$ storage nodes 106(1) . . . 106(n). Thus, the latency to access file 310(i) under functional caching is determined by the maximum processing (queuing) delay of the storage nodes 106(1) . . . 106($k_i - d_{i,t}$) from which server 102 receives the $k_i - d_{i,t}$ of chunks 314(1) . . . 314($k_i - d_{i,t}$).

In one embodiment, a file request is forwarded to a set of storage nodes 106(1) . . . 106($k_i - d_i$) (denoted by $A_{i,t} \subseteq S_i$ where S is the total number of storage nodes 106 in system 100) with predetermined probabilities $\{\pi_{i,j,t} \in [0, 1], \forall_{i,j,t}\}$ for $j \in A_{i,t}$. Each storage node 106(1) . . . 106($k_j - d_i$) then manages a local queue and processes chunk requests with service rate $\mu_j$. While the local queues are not independent due to coupled request arrivals, order statistical analysis may be utilized to derive an upper bound of mean service latency in closed-form. The result is then optimized over probabilities $\pi_{i,j,t}$ to obtain the tightest bound. If $Q_{j,t}$ be the (random) waiting time a chunk request spends in the queue of storage node 106(j) in time-bin t. Using the functional caching approach, requests of file i see mean latency $\bar{T}_{i,t}$ given by:

$$\bar{T}_{i,t} = \mathbb{E}\left[\mathbb{E}_{\mathcal{A}_{i,t}}\left(\max_{j \in \mathcal{A}_{i,t}} \{Q_{j,t}\}\right)\right]$$

Where the first expectation is taken over system queuing dynamics and the second expectation is taken over random dispatch decisions $A_{i,j}$.

In one example, $X_j$ denotes the service time per chunk at a node j which has an arbitrary distribution satisfying finite mean $E[X_j] = 1/\mu_j$, variance $E[X^2] - E[X_j]2 = \sigma2$, a second moment $E[Xj] = \Gamma j$, and third moment $E[Xj] = \Gamma^\wedge_j$. These statistics can be readily inferred from techniques related to network delay and file-size distribution.

An upper bound on the expected latency is given as follows. The expected latency $T_{i,t}$ of file 310(i) in time-bin t under probabilistic scheduling is upper bounded by $\bar{U}_{i,t}$ given by:

$$\bar{U}_{i,t} = \min_{z_{i,t} \in \mathbb{R}} \left\{ z_{i,t} + \sum_{j \in S_{i,t}} \frac{\pi_{i,j,t}}{2} (\mathbb{E}[Q_{j,t}] - z_{i,t}) + \sum_{j \in S_{i,t}} \frac{\pi_{i,j,t}}{2}\left[\sqrt{(\mathbb{E}[Q_{j,t}] - z_{i,t})^2 + Var[Q_{j,t}]}\right]\right\}$$

where $$\mathbb{E}[Q_{j,t}] = \frac{1}{\mu_j} + \frac{\Lambda_{j,t} \Gamma_j^2}{2(1 - \rho_{j,t})},$$

$$Var[Q_{j,t}] = \sigma_j^2 + \frac{\Lambda_{j,t} \Gamma_j^3}{3(1 - \rho_{j,t})} + \frac{\Lambda_{j,t}^2 \Gamma_j^4}{4(1 - \rho_{j,t})^2},$$

where $\rho_{j,t} = \Lambda_{j,t}/\mu_j$ is the request intensity at node j, and $\Lambda j,t = \Sigma_i \lambda_{i,j,t} \pi_{i,j,t}$ is the mean arrival rate at node j.

An embodiment of cache optimization in a single time-bin t will now be described for illustrative purposes. In one example, the optimization will occur over cache content placement $d_{i,t}$ scheduling probabilities $\pi_{i,j,t}$, and an auxiliary variable $z_{i,t}$ in the upper bound. If, in one example, $\lambda_t = \Sigma_i \lambda_{i,t}$ is the total arrival rate, then $\lambda_{i,t}/\hat{\lambda}$ is the fraction of file requests, and average latency of all files is given by $\Sigma_i (\lambda_{i,t}/\hat{\lambda}_i) \bar{T}_{i,t}$. To minimize an average latency objective, i.e.

$$\min \sum_{i=1}^{r} \frac{\lambda_{i,t}}{\hat{\lambda}_t} \bar{U}_i,$$

s.t. (2), (3), (4), $\sum_{j=1}^{m} \pi_{i,j,t} = k_i - d_{i,t}, \pi_{i,j,t}, d_{i,t} \geq 0,$ $\sum_i d_{i,t} \leq C, \pi_{i,j,t} = 0$ for $j \notin S_i, \pi_{i,j,t} \leq 1,$ $z_{i,t} \geq 0, d_{i,t} \in \mathbb{Z}.$ var. $\pi_{i,j,t}, d_{i,t}, z_{i,t} \forall i, j, t.$ Here the constraints $\Sigma_{j=1}^{m} \pi_{i,j,t} = k_i - d_{i,t}$ and $\pi_{i,j,t} \leq 1$ ensure that $k_i - d_{i,t}$ distinct storage nodes (along with $d_{i,t}$ chunks in cache 104) are selected to process each file request, following probabilistic scheduling. Because storage nodes 106 without desired chunks cannot be elected, i.e., $\pi_{i,j,t} = 0$ for $j \in /S_i$. Finally, the cache has a capacity constraint $\Sigma_i d_{i,t} \leq 0$.

Cache optimization provides an optimal cache content placement and scheduling policy to minimize file access latency. The constraint $z_{i,t}$ is not needed if a file 310(i) is not completely in cache 104. However, the latency bound does not hold if the file is completely in the cache since in that case the bound is $z_{i,t}$ in the above expression. In order to avoid having indicators representing the constraint on $z_{i,t} = 0$ if the file 310(i) is in the cache 104, consider $z_{i,t} \geq 0$ making the latency bound hold irrespective of number of chunks 316(1) . . . 316($d_t$) in the cache 104. Accordingly, a cache optimization expression can be written as follows:

$$\min \sum_i \lambda_{i,t} z_{i,t}/\hat{\lambda}_t + \sum_i \sum_{j=1}^{m} \frac{\lambda_{i,t} \pi_{i,j,t}}{2\hat{\lambda}_t} \left[ X_{i,j,t} + \sqrt{X_{i,j,t}^2 + Y_{j,t}} \right]$$

s.t. $X_{i,j,t} = \frac{1}{\mu_j} + \frac{\Lambda_{j,t} \Gamma_j^2}{2(1-\rho_{j,t})} - z_{i,t}, \forall j$ $Y_{j,t} = \sigma_j^2 + \frac{\Lambda_{j,t} \Gamma_j^3}{3(1-\rho_{j,t})} + \frac{\Lambda_{j,t}^2 \Gamma_j^4}{4(1-\rho_{j,t})^2}, \forall j$ $\rho_{j,t} = \Lambda_{j,t}/\mu_j < 1; \Lambda_{j,t} = \sum_{i=1}^{r} \pi_{i,j,t} \lambda_{i,t} \forall j$ $\sum_{j=1}^{m} \pi_{i,j,t} = k_i - d_{i,t}; \pi_{i,j,t} \in [0, 1]; z_{i,t} \geq 0,$ $\pi_{i,j,t} = 0 \forall j \notin S_i, \sum_i d_{i,t} \leq C, d_{i,t} \in \mathbb{Z}^+$ var. $z_{i,t}, d_{i,t}, \pi_{i,j,t}, \forall i, j.$ The above optimization expression is a problem of integer optimization, since the number $d_{i,t}$ of chunks 316(1) . . . 316($d_{i,t}$) in cache 104 must be integers. To solve this problem, in one embodiment, a heuristic algorithm is utilized, which iteratively identifies the files that benefit most from caching, and constructs/stores functional chunks 316 (1) . . . 316($d_{i,t}$) into the cache 104 accordingly. The variable $d_{i,t}$ can be absorbed into a scheduling decision $\pi_{i,j,t}$ because of the equality constraint $d_{i,j} = k_i - \Sigma_{j=1}^{m} \pi_{i,j,t}$. Therefore, there are two set of variables $z_{i,t}$ and $\pi_{i,j,t}$ to consider. The objective function is convex in both these variables, however there is an integer constraint on $\Sigma_{j=1}^{m} \pi_{i,j,t}$ due to the integer requirement of $d_{i,t}$.

The optimization in one example employs an alternating minimization over two dimensions—the first through solving $z_{i,t}$ given, $\pi_{i,j,t}$ and the second through solving $\pi_{i,j,t}$ given $z_{i,t}$. The first problem is convex, and may be easily solved by gradient descent. However, the second problem has an integer constraint. To address this, the integer constraint is removed. Then, a certain percentage of files 310(i) with a fractional part of content accessed from the disk is highest are added a part in the disk to make the part in disk as integers. The optimization over $\pi_{i,j,t}$ shall run until $\Sigma_{j=1}^{m} \pi_{i,j,t}$ for all files is an integer. Accordingly, two sub-problems are derived that are solved as follows.

The first, referred to herein, as Prob_Z for given $\pi_{i,j,t}$ is:

$$\min \sum_i \lambda_{i,t} z_{i,t}/\hat{\lambda}_t + \sum_i \sum_{j=1}^{m} \frac{\lambda_{i,t} \pi_{i,j,t}}{2\hat{\lambda}_t} \left[ X_{i,j,t} + \sqrt{X_{i,j,t}^2 + Y_{j,t}} \right]$$

s.t. $X_{i,j,t} = \frac{1}{\mu_j} + \frac{\Lambda_{j,t} \Gamma_j^2}{2(1-\rho_{j,t})} - z_{i,t}, \forall j$ $Y_{j,t} = \sigma_j^2 + \frac{\Lambda_{j,t} \Gamma_j^3}{3(1-\rho_{j,t})} + \frac{\Lambda_{j,t}^2 \Gamma_j^4}{4(1-\rho_{j,t})^2}, \forall j$ $\rho_{j,t} = \Lambda_{j,t}/\mu_j, \Lambda_{j,t} = \sum_{i=1}^{r} \pi_{i,j,t} \lambda_{i,t} \forall j$ $z_{i,t} \geq 0$ var. $z_{i,t}, \forall i.$ The second, referred to as Prob_II, for given $z_{i,t}$, $k_{U,i,t}$, $k_{L,u,t}$ is $$\min \sum_i \lambda_{i,t} z_{i,t}/\hat{\lambda}_t + \sum_i \sum_{j=1}^{m} \frac{\lambda_{i,t} \pi_{i,j,t}}{2\hat{\lambda}_t} \left[ X_{i,j,t} + \sqrt{X_{i,j,t}^2 + Y_{j,t}} \right]$$

s.t. $X_{i,j,t} = \frac{1}{\mu_j} + \frac{\Lambda_{j,t} \Gamma_j^2}{2(1-\rho_{j,t})} - z_{i,t}, \forall j$ $Y_{j,t} = \sigma_j^2 + \frac{\Lambda_{j,t} \Gamma_j^3}{3(1-\rho_{j,t})} + \frac{\Lambda_{j,t}^2 \Gamma_j^4}{4(1-\rho_{j,t})^2}, \forall j$ $\rho_{j,t} = \Lambda_{j,t}/\mu_j < 1; \Lambda_{j,t} = \sum_{i=1}^{r} \pi_{i,j,t} \lambda_{i,t} \forall j$ $K_{L,i,t} \leq \sum_{j=1}^{m} \pi_{i,j,t} \leq k_{U,i,t}; \pi_{i,j,t} \in [0, 1];$ $\pi_{i,j,t} = 0 \forall j \notin S_i, \sum_i \left( k_i - \sum_{j=1}^{m} \pi_{i,j,t} \right) \leq C,$ var. $\pi_{i,j,t}, \forall i, j.$ The problem Prob_Z optimizes over $z_{i,t}$ given $\pi_{i,j,t}$. This problem is convex with one linear constraint $z_{i,t} \geq 0$. A standard gradient descent is used to solve the problem, making $z_{i,t}$ a zero if the solution is negative in each iteration. The problem Prob_II assumes that the number of total chunks of a file 310(i) accessed from the disk is between $k_{L,i,t}$ and $k_{U,i,t}$. As the number of chunks 316 in the cache 104 for each file are decided, these two bounds will become equal. This problem is also convex, and can be solved using projected gradient descent. With algorithmic solution to these two sub-problems, the algorithm for Distributed Storage with Caching is given as follows:

Initialize c=0 and feasible ($z_{i,t}$, $\pi_{i,j,t}$, $\forall_{i,j}$).
    Compute current objective value B(0).
    Initialize c=0 and feasible ($z_{i,t}$, $\pi_{i,j,t}$, $\forall_{i,j}$).
    Compute current objective value B(0).
    do
      Solve Convex Problem Prob_Z to get $z_{i,t}$ for given $\pi_{i,j,t}$ for all i.
      Set $k_{L,i,t}$=0, $k_{U,i,t}$=$k_i$.
      do
        Solve Convex Problem prob_II to get $\pi_{i,j,t}$ for given $z_{i,t}$, $k_{L,i,t}$, $k_{U,i,t}$ for all i and j.
        Let $i_1$=arg max (fractional part of $\Sigma_{j=1}^{m} \pi_{i,j,t}$) $k_{L,i,t}$=$k_{U,i,t}$=ceil($\Sigma_{j=1}^{m} \pi_{i,j,t}$).
      while $\Sigma_i$ frac($\Sigma_{j=1}^{m} \pi_{i,j,t}$)>0.
      Compute new objective value $B^{(c+1)}$, Update c=c+1.
    while $B^{(c)}$−$B^{(c-1)}$>ε.

It should be noted that the inner do-while logic to deal with integer optimization runs at most r times. Since r may be large, rather than choosing one index $i_1$, we choose a ceiling of certain fraction of file indices among those which have fractional content in the cache. This makes the loop run in O(log r). Thus, each outer loop runs O(log r) convex problems. The algorithm will be solved repeatedly for each time bin to guide the update of cache 104 content for service latency minimization.

Figure 7:
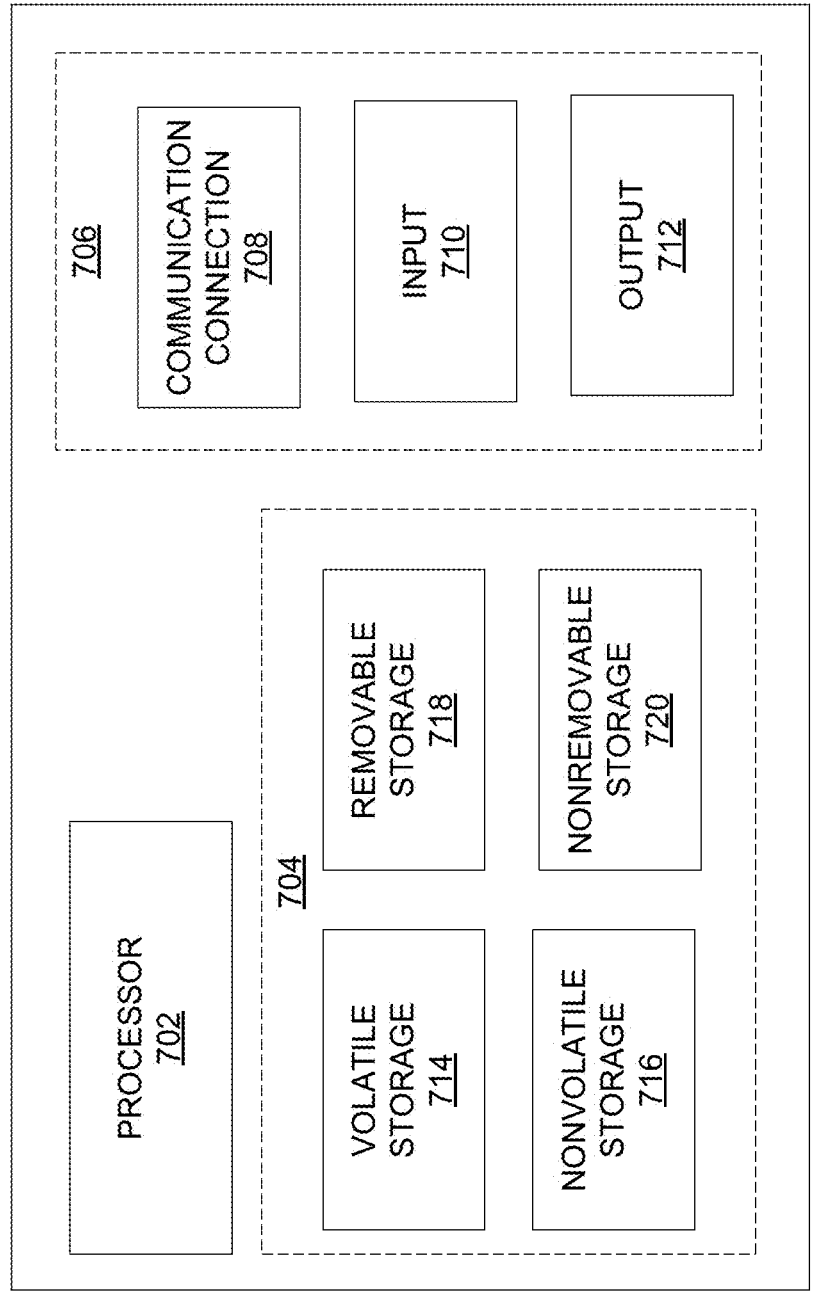
FIG. 7 is a schematic of an exemplary network device.

FIG. 7 is a block diagram of network device 700 that may be connected to or comprise a component of cellular network 112 or wireless network 114. Network device 700 may comprise hardware or a combination of hardware and software. The functionality to facilitate telecommunications via a telecommunications network may reside in one or combination of network devices 700. Network device 700 depicted in FIG. 7 may represent or preform functionality of an appropriate network device 700, or combination of network devices 700, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC) or the like, or any appropriate combination thereof. It is emphasized that the block diagram depicted in FIG. 7 is exemplary and not intended to imply a limitation to a specific implementation or configuration. Thus, network device 700 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 700 may comprise a processor 702 and a memory 704 coupled to processor 702. Memory 704 may contain executable instructions that, when executed by processor 702, cause processor 702 to effectuate operations associated with mapping wireless signal strength. As evident from the description herein, network device 700 is not to be construed as software per se.

In addition to processor 702 and memory 704, network device 700 may include an input/output system 706. Processor 702, memory 704, and input/output system 706 may be coupled together (coupling not shown in FIG. 7) to allow communications therebetween. Each portion of network device 700 may comprise circuitry for performing functions associated with each respective portion. Thus, each portion may comprise hardware, or a combination of hardware and software. Accordingly, each portion of network device 700 is not to be construed as software per se. Input/output system 706 may be capable of receiving or providing information from or to a communications device or other network entities configured for telecommunications. For example input/output system 706 may include a wireless communications (e.g., 3G/4G/GPS) card. Input/output system 706 may be capable of receiving or sending video information, audio information, control information, image information, data, or any combination thereof. Input/output system 706 may be capable of transferring information with network device 700. In various configurations, input/output system 706 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 706 may comprise a Wi-Fi finder, a two-way GPS chipset of equivalent, or the like, or a combination thereof.

Input/output system 706 of network device 700 also may contain a communication connection 708 that allows network device 700 to communicate with other devices, network entities, or the like. Communication connection 708 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 706 also may include an input device 710 such as keyboard, mouse, pen, voice input device, or touch input device. Input/output system 706 may also include an output device 712, such as a display, speakers, or a printer.

Processor 702 may be capable of performing functions associated with telecommunications, such as functions for processing broadcast messages, as described herein. For example, processor 702 may be capable of, in conjunction with any other portion of network device 700, determining a type of broadcast message and acting according to the broadcast message type or content, as described herein.

Memory 704 of network device 700 may comprise a storage medium having a concrete, tangible, physical structure. As is known, a signal does not have a concrete, tangible, physical structure. Memory 704, as well as any computer-readable storage medium described herein, is not to be construed as signal. Memory 704, as well as any computer-readable storage medium described herein, is not to be construed as a transient signal. Memory 704, as well as any computer-readable storage medium described herein, is not to be construed as a propagating signal. Memory 704, as well as any computer-readable storage medium described herein, is to be construed as an article of manufacture.

Memory 704 may store any information utilized in conjunction with telecommunications. Depending upon the exact configuration or type of processor, memory 704 may include a volatile storage 714 (such as some types of RAM), a nonvolatile storage 716 (such as ROM, flash memory), or a combination thereof. Memory 704 may include additional storage (e.g., a removable storage 718 or a nonremovable storage 720) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 700. Memory 704 may comprise executable instructions that, when executed by processor 702, cause processor 702 to effectuate operations to map signal strengths in an area of interest.

Figure 8:
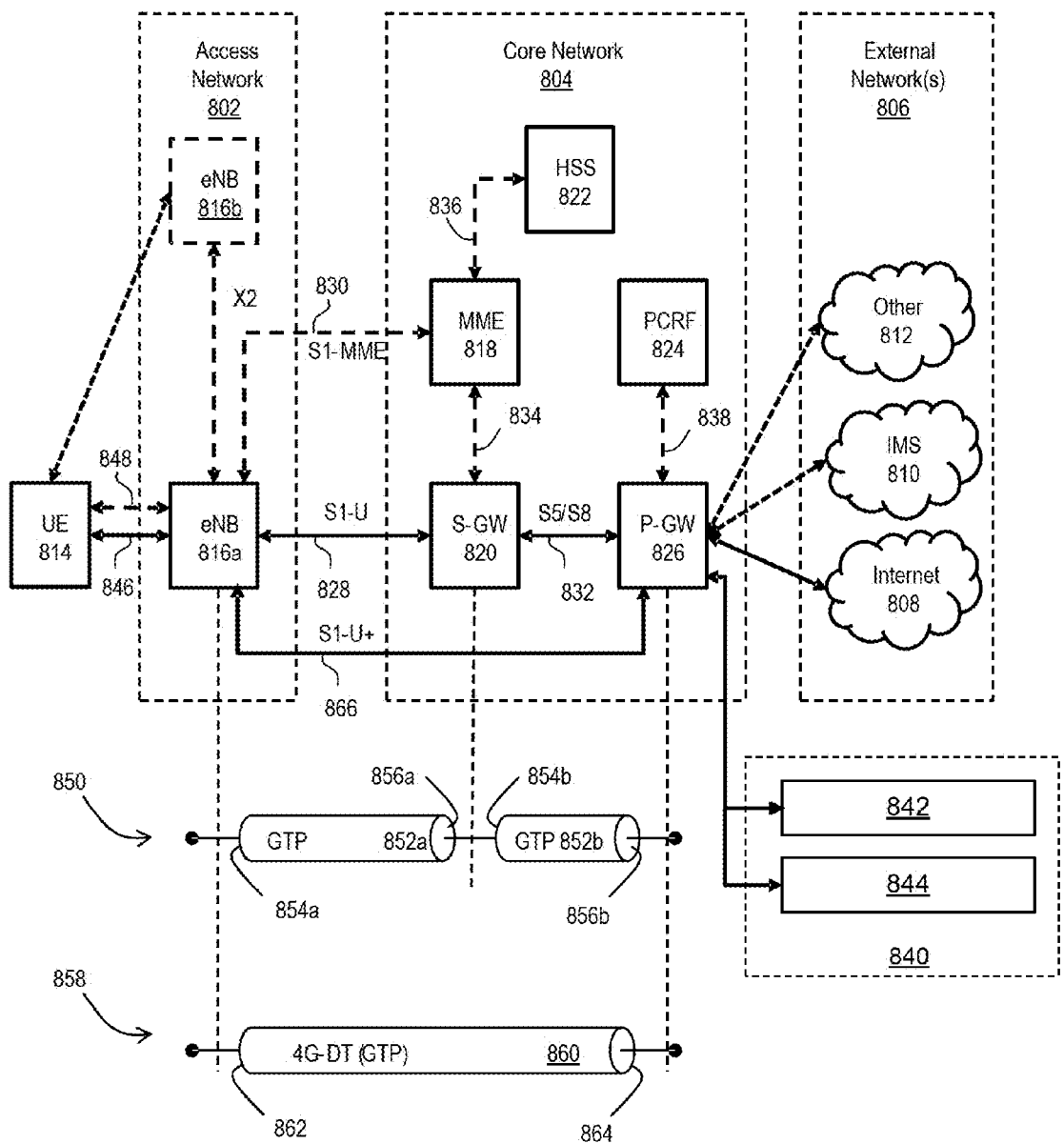
FIG. 8 depicts an exemplary communication system that provides wireless telecommunication services over wireless communication networks.

FIG. 8 illustrates a functional block diagram depicting one example of an LTE-EPS network architecture 800 related to the current disclosure. In particular, the network architecture 800 disclosed herein is referred to as a modified LTE-EPS architecture 800 to distinguish it from a traditional LTE-EPS architecture.

An example modified LTE-EPS architecture 800 is based at least in part on standards developed by the 3rd Generation Partnership Project (3GPP), with information available at www.3gpp.org. In one embodiment, the LTE-EPS network architecture 800 includes an access network 802, a core network 804, e.g., an EPC or Common BackBone (CBB) and one or more external networks 806, sometimes referred to as PDN or peer entities. Different external networks 806 can be distinguished from each other by a respective network identifier, e.g., a label according to DNS naming conventions describing an access point to the PDN. Such labels can be referred to as Access Point Names (APN). External networks 806 can include one or more trusted and non-trusted external networks such as an internet protocol (IP) network 808, an IP multimedia subsystem (IMS) network 810, and other networks 812, such as a service network, a corporate network, or the like.

Access network 802 can include an LTE network architecture sometimes referred to as Evolved Universal mobile Telecommunications system Terrestrial Radio Access (E UTRA) and evolved UMTS Terrestrial Radio Access Network (E-UTRAN). Broadly, access network 802 can include one or more communication devices, commonly referred to as UE 804, and one or more wireless access nodes, or base stations 816a, 816b. During network operations, at least one base station 816 communicates directly with UE 814. Base station 816 can be an evolved Node B (e-NodeB), with which UE 814 communicates over the air and wirelessly. UEs 814 can include, without limitation, wireless devices, e.g., satellite communication systems, portable digital assistants (PDAs), laptop computers, tablet devices and other mobile devices (e.g., cellular telephones, smart appliances, and so on). UEs 814 can connect to eNBs 816 when UE 814 is within range according to a corresponding wireless communication technology.

UE 814 generally runs one or more applications that engage in a transfer of packets between UE 814 and one or more external networks 806. Such packet transfers can include one of downlink packet transfers from external network 806 to UE 814, uplink packet transfers from UE 814 to external network 806 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 804, e.g. according to parameters, such as the QoS.

Core network 804 uses a concept of bearers, e.g., EPS bearers, to route packets, e.g., IP traffic, between a particular gateway in core network 804 and UE 814. A bearer refers generally to an IP packet flow with a defined QoS between the particular gateway and UE 814. Access network 802, e.g., E UTRAN, and core network 804 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 804 includes various network entities, such as MME 818, SGW 820, Home Subscriber Server (HSS) 822, Policy and Charging Rules Function (PCRF) 824 and PGW 826. In one embodiment, MME 818 comprises a control node performing a control signaling between various equipment and devices in access network 802 and core network 804. The protocols running between UE 814 and core network 804 are generally known as Non-Access Stratum (NAS) protocols.

For illustration purposes only, the terms MME 818, SGW 820, HSS 822 and PGW 826, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 820 routes and forwards all user data packets. SGW 820 also acts as a mobility anchor for user plane operation during handovers between base stations, e.g., during a handover from first eNB 816a to second eNB 826b as may be the result of UE 814 moving from one area of coverage, e.g., cell, to another. SGW 820 can also terminate a downlink data path, e.g., from external network 806 to UE 814 in an idle state, and trigger a paging operation when downlink data arrives for UE 814. SGW 820 can also be configured to manage and store a context for UE 814, e.g., including one or more of parameters of the IP bearer service and network internal routing information. In addition, SGW 820 can perform administrative functions, e.g., in a visited network, such as collecting information for charging (e.g., the volume of data sent to or received from the user), and/or replicate user traffic, e.g., to support a lawful interception. SGW 820 also serves as the mobility anchor for interworking with other 3GPP technologies such as universal mobile telecommunication system (UMTS).

At any given time, UE 814 is generally in one of three different states: detached, idle, or active. The detached state is typically a transitory state in which UE 814 is powered on but is engaged in a process of searching and registering with network 802. In the active state, UE 814 is registered with access network 802 and has established a wireless connection, e.g., radio resource control (RRC) connection, with eNB 816. Whether UE 814 is in an active state can depend on the state of a packet data session, and whether there is an active packet data session. In the idle state, UE 814 is generally in a power conservation state in which UE 814 typically does not communicate packets. When UE 814 is idle, SGW 820 can terminate a downlink data path, e.g., from one peer entity 806, and triggers paging of UE 814 when data arrives for UE 814. If UE 814 responds to the page, SGW 820 can forward the IP packet to eNB 816a.

HSS 822 can manage subscription-related information for a user of UE 814. For example, HSS 822 can store information such as authorization of the user, security requirements for the user, quality of service (QoS) requirements for the user, etc. HSS 822 can also hold information about external networks 806 to which the user can connect, e.g., in the form of an APN of external networks 806. For example, MME 818 can communicate with HSS 822 to determine if UE 814 is authorized to establish a call, e.g., a voice over IP (VoIP) call before the call is established.

PCRF 824 can perform QoS management functions and policy control. PCRF 824 is responsible for policy control decision-making, as well as for controlling the flow-based charging functionalities in a policy control enforcement function (PCEF), which resides in PGW 826. PCRF 824 provides the QoS authorization, e.g., QoS class identifier and bit rates that decide how a certain data flow will be treated in the PCEF and ensures that this is in accordance with the user's subscription profile.

PGW 826 can provide connectivity between the UE 814 and one or more of the external networks 806. In illustrative network architecture 800, PGW 826 can be responsible for IP address allocation for UE 814, as well as one or more of QoS enforcement and flow-based charging, e.g., according to rules from the PCRF 824. PGW 826 is also typically responsible for filtering downlink user IP packets into the different QoS-based bearers. In at least some embodiments, such filtering can be performed based on traffic flow templates. PGW 826 can also perform QoS enforcement, e.g., for guaranteed bit rate bearers. PGW 826 also serves as a mobility anchor for interworking with non-3GPP technologies such as CDMA2000.

Within access network 802 and core network 804 there may be various bearer paths/interfaces, e.g., represented by solid lines 828 and 830. Some of the bearer paths can be referred to by a specific label. For example, solid line 828 can be considered an S1-U bearer and solid line 832 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 84 can include various signaling bearer paths/interfaces, e.g., control plane paths/interfaces represented by dashed lines 830, 834, 836, and 838. Some of the signaling bearer paths may be referred to by a specific label. For example, dashed line 830 can be considered as an S1-MME signaling bearer, dashed line 834 can be considered as an S11 signaling bearer and dashed line 836 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 866. In the illustrative example, the S1-U+ user plane interface extends between the eNB 816a and PGW 826. Notably, S1-U+ path/interface does not include SGW 820, a node that is otherwise instrumental in configuring and/or managing packet forwarding between eNB 816a and one or more external networks 806 by way of PGW 826. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 820, 826 due to excessive handover events.

In some embodiments, PGW 826 is coupled to storage device 840, shown in phantom. Storage device 840 can be integral to one of the network nodes, such as PGW 826, for example, in the form of internal memory and/or disk drive. It is understood that storage device 840 can include registers suitable for storing address values. Alternatively or in addition, storage device 840 can be separate from PGW 826, for example, as an external hard drive, a flash drive, and/or network storage.

Storage device 840 selectively stores one or more values relevant to the forwarding of packet data. For example, storage device 840 can store identities and/or addresses of network entities such as any of network nodes 818, 820, 824, and 826, eNBs 826 and/or UE 814. In the illustrative example, storage device 840 includes a first storage location 842 and a second storage location 844. First storage location 842 can be dedicated to storing a Currently Used Downlink address value 842. Likewise, second storage location 844 can be dedicated to storing a Default Downlink Forwarding address value 844. PGW 826 can read and/or write values into either of storage locations 842, 844, for example, managing Currently Used Downlink Forwarding address value 842 and Default Downlink Forwarding address value 844 as disclosed herein.

In some embodiments, the Default Downlink Forwarding address for each EPS bearer is the SGW S5-U address for each EPS Bearer. The Currently Used Downlink Forwarding address" for each EPS bearer in PGW 826 can be set every time when PGW 826 receives an uplink packet e.g., a GTP-U uplink packet, with a new source address for a corresponding EPS bearer. When UE 814 is in an idle state, the "Current Used Downlink Forwarding address" field for each EPS bearer of UE 814 can be set to a "null" or other suitable value.

In some embodiments, the Default Downlink Forwarding address is only updated when PGW 826 receives a new SGW S5-U address in a predetermined message or messages. For example, the Default Downlink Forwarding address is only updated when PGW 826 receives one of a Create Session Request, Modify Bearer Request and Create Bearer Response messages from SGW 820.

As values 842, 844 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 802 and core network 804 are illustrated in a simplified block diagram in FIG. 8. In other words, either or both of access network 802 and the core network 804 can include additional network elements that are not shown, such as various routers, switches and controllers. In addition, although FIG. 8 illustrates only a single one of each of the various network elements, it should be noted that access network 802 and core network 804 can include any number of the various network elements. For example, core network 804 can include a pool (i.e., more than one) of MMEs 818, SGWs 820 or PGWs 826.

In the illustrative example, data traversing a network path between UE 814, eNB 816a, SGW 820, PGW 826 and external network 806 may be considered to constitute data transferred according to an end-to-end IP service. However, for the present disclosure, to properly perform establishment management in LTE-EPS network architecture 800, the core network, data bearer portion of the end-to-end IP service is analyzed.

An establishment may be defined herein as a connection set up request between any two elements within LTE-EPS network architecture 800. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 846) between UE 814 and eNB 816a, a second portion (e.g., an S1 data bearer 828) between eNB 816a and SGW 820, and a third portion (e.g., an S5/S8 bearer 832) between SGW 820 and PGW 826. Various signaling bearer portions are also illustrated in FIG. 8. For example, a first signaling portion (e.g., a signaling radio bearer 848) between UE 814 and eNB 816a, and a second signaling portion (e.g., S1 signaling bearer 830) between eNB 816a and MME 818.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 800, e.g., by one or more of tunnel endpoint identifiers, an IP address and user datagram protocol port number. Within a particular tunnel connection, payloads, e.g., packet data, which may or may not include protocol related information, are forwarded between tunnel endpoints.

An example of first tunnel solution 850 includes a first tunnel 852a between two tunnel endpoints 854a and 856a, and a second tunnel 852b between two tunnel endpoints 854b and 856b. In the illustrative example, first tunnel 852a is established between eNB 816a and SGW 820. Accordingly, first tunnel 852a includes a first tunnel endpoint 854a corresponding to an S1-U address of eNB 816a (referred to herein as the eNB S1-U address), and second tunnel endpoint 856a corresponding to an S1-U address of SGW 820 (referred to herein as the SGW S1-U address). Likewise, second tunnel 852b includes first tunnel endpoint 854b corresponding to an S5-U address of SGW 820 (referred to herein as the SGW S5-U address), and second tunnel endpoint 856b corresponding to an S5-U address of PGW 826 (referred to herein as the PGW S5-U address).

In at least some embodiments, first tunnel solution 850 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 858 includes a single or direct tunnel 860 between tunnel endpoints 862 and 864. In the illustrative example, direct tunnel 860 is established between eNB 816a and PGW 826, without subjecting packet transfers to processing related to SGW 820. Accordingly, direct tunnel 860 includes first tunnel endpoint 862 corresponding to the eNB S1-U address, and second tunnel endpoint 864 corresponding to the PGW S5-U address. Packet data received at either end can be encapsulated into a payload and directed to the corresponding address of the other end of the tunnel. Such direct tunneling avoids processing, e.g., by SGW 820 that would otherwise relay packets between the same two endpoints, e.g., according to a protocol, such as the GTP-U protocol.

In some scenarios, direct tunneling solution 858 can forward user plane data packets between eNB 816a and PGW 826, by way of SGW 820. That is, SGW 820 can serve a relay function, by relaying packets between two tunnel endpoints 816a, 826. In other scenarios, direct tunneling solution 858 can forward user data packets between cNB 816a and PGW 826, by way of the S1-U+ interface, thereby bypassing SGW 820.

Generally, UE 814 can have one or more bearers at any one time. The number and types of bearers can depend on applications, default requirements, and so on. It is understood that the techniques disclosed herein, including the configuration, management and use of various tunnel solutions 850, 858, can be applied to the bearers on an individual bases. That is, if user data packets of one bearer, say a bearer associated with a VoIP service of UE 814, then the forwarding of all packets of that bearer are handled in a similar manner. Continuing with this example, the same UE 814 can have another bearer associated with it through the same eNB 816a. This other bearer, for example, can be associated with a relatively low rate data session forwarding user data packets through core network 804 simultaneously with the first bearer. Likewise, the user data packets of the other bearer are also handled in a similar manner, without necessarily following a forwarding path or solution of the first bearer. Thus, one of the bearers may be forwarded through direct tunnel 858; whereas, another one of the bearers may be forwarded through a two-tunnel solution 850.

Figure 9:
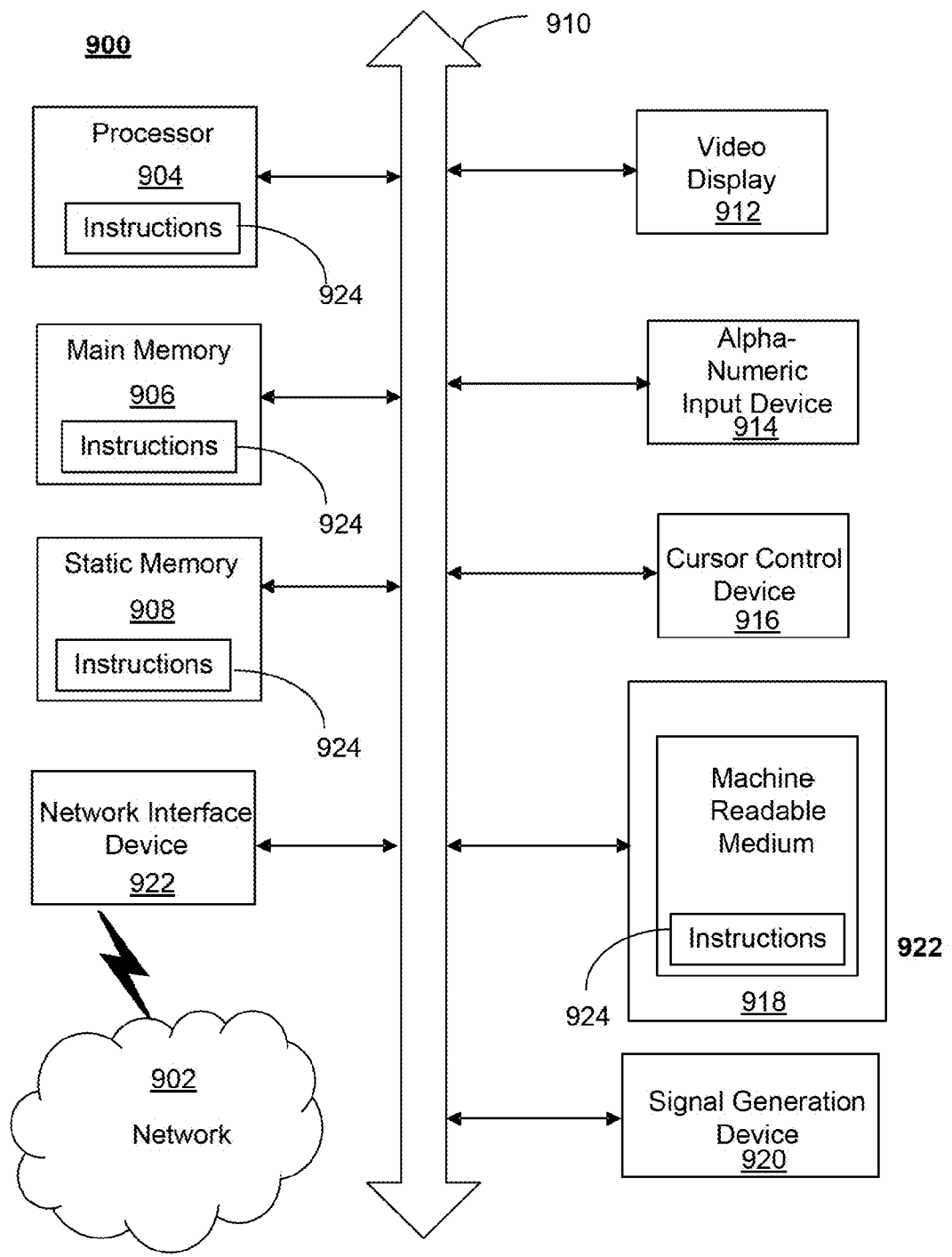
FIG. 9 depicts an exemplary communication system that provides wireless telecommunication services over wireless communication networks.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as processor 702, UE 814, eNB 816, MME 818, SGW 820, HSS 822, PCRF 824, PGW 826 and other devices of FIGS. 1, 7, and 8. In some embodiments, the machine may be connected (e.g., using a network 902) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 900 may include a processer (or controller) 904 (e.g., a central processing unit (CPU), a graphics processing unit (GPU, or both), a main memory 906 and a static memory 908, which communicate with each other via a bus 910. The computer system 900 may further include a display unit 912 (e.g., a liquid crystal display (LCD), a flat panel, or a solid state display). Computer system 900 may include an input device 914 (e.g., a keyboard), a cursor control device 916 (e.g., a mouse), a disk drive unit 918, a signal generation device 920 (e.g., a speaker or remote control) and a network interface device 922. In distributed environments, the embodiments described in the subject disclosure can be adapted to utilize multiple display units 912 controlled by two or more computer systems 900. In this configuration, presentations described by the subject disclosure may in part be shown in a first of display units 912, while the remaining portion is presented in a second of display units 912.

The disk drive unite 918 may include a tangible computer-readable storage medium 924 on which is stored one or more sets of instructions (e.g., software 926) embodying any one or more of the methods or functions described herein, including those methods illustrated above. Instructions 926 may also reside, completely or at least partially, within main memory 901, static memory 908, or within processor 904 during execution thereof by the computer system 900. Main memory 906 and processor 904 also may constitute tangible computer-readable storage media.

Figure 10:
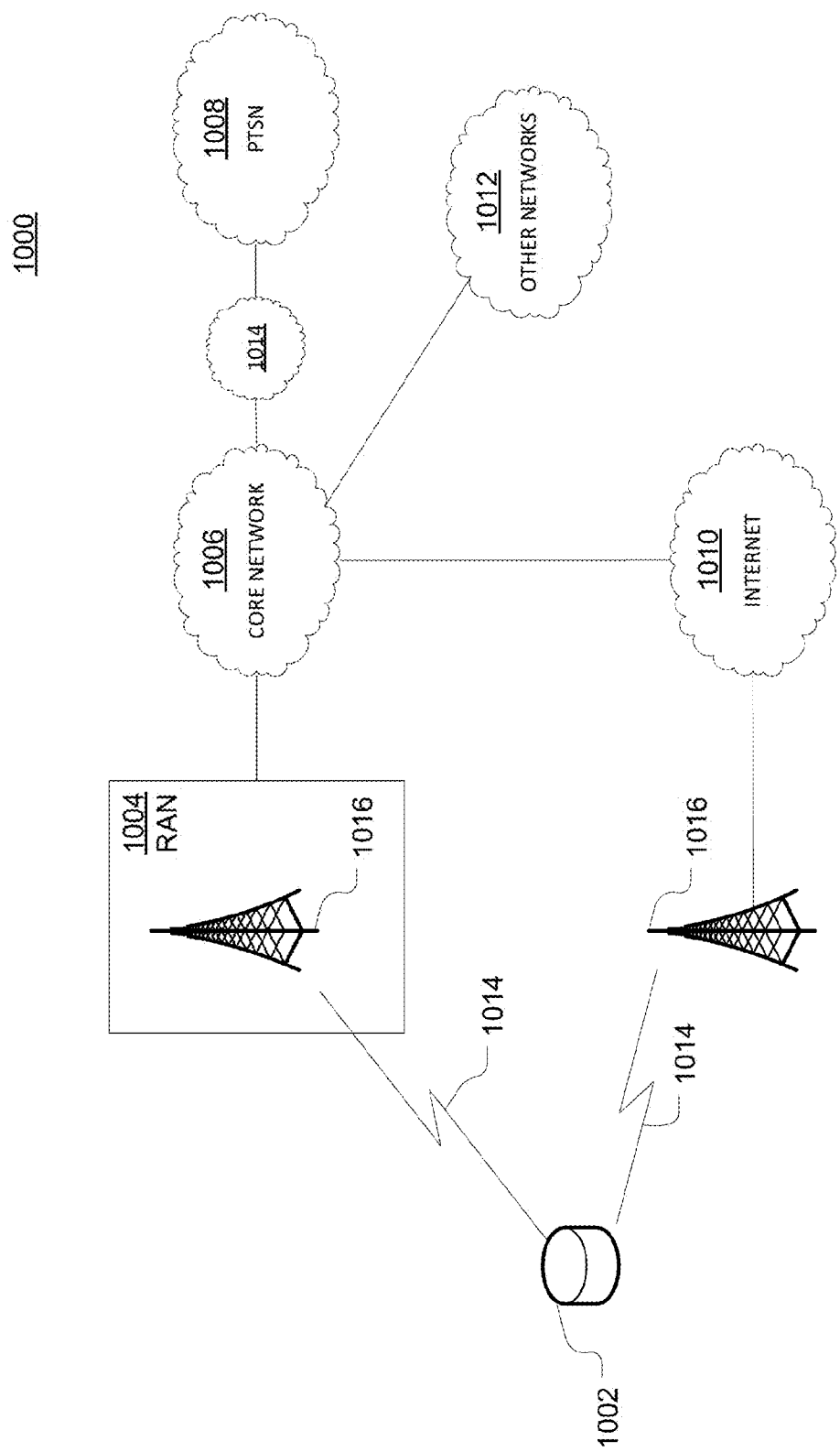
FIG. 10 is a diagram of an exemplarly telecommunications system in which the disclosed methods and processes may be implemented.

As shown in FIG. 10, telecommunication system 1000 may include wireless transmit/receive units (WTRUs) 1002, a RAN 1004, a core network 1006, a public switched telephone network (PSTN) 1008, the Internet 1010, or other networks 1012, though it will be appreciated that the disclosed examples contemplate any number of WTRUs, base stations, networks, or network elements. Each WTRU 1002 may be any type of device configured to operate or communicate in a wireless environment. For example, a WTRU may comprise drone 102, a mobile device, network device 300, or the like, or any combination thereof. By way of example, WTRUs 1002 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 1002 may be configured to transmit or receive wireless signals over an air interface 1014.

Telecommunication system 1000 may also include one or more base stations 1016. Each of base stations 1016 may be any type of device configured to wirelessly interface with at least one of the WTRUs 1002 to facilitate access of one or more communication networks, such as core network 1006, PTSN 1008, Internet 1010, or other networks 1012. By way of example, base stations 1016 may be a base transceiver station (BTS), a Node-B, an eNode B, a Home Node B, a Home eNode B, a site controller, an access point (AP), a wireless router, or the like. While base stations 1016 are each depicted as a single element, it will be appreciated that base stations 1016 may include any number of interconnected base stations or network elements.

RAN 1004 may include one or more base stations 1016, along with other network elements (not shown), such as a base station controller (BSC), a radio network controller (RNC), or relay nodes. One of more base stations 1016 may be configured to transmit or receive wireless signals within a particular geographic region, which may be referred to as a cell (not shown). The cell may further be divided into cell sectors. For example, the cell associated with base station 1016 may be divided into three sectors such that base station 1016 may include three transceivers; one for each sector of the cell. In another example, base station 1016 may employ multiple-input multiple-output (MIMO) technology and, therefore, may utilize multiple transceivers for each sector of the cell.

Base stations 1016 may communicate with one or more of WTRUs 1002 over air interface 1014, which may be any suitable wireless communication link (e.g., RF, microwave, infrared (IR), ultraviolet (UV), or visible light). Air interface 1014 may be established using any suitable radio access technology (RAT).

More specifically, as noted above, telecommunication system 1000 may be a multiple access system and may employ one or more channel access schemes, such as CDMA, TDMA, FDMA, OFDMA, SC-FDMA, or the like. For example, base station 1016 in RAN 1004 and WTRUs 1002 connected to RAN 1004 may implement a radio technology such as Universal Mobile Telecommunications System (UMTS) Terrestrial Radio Access (UTRA) that may establish air interface 1014 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 1016 and WTRUs 1002 that are connected to RAN 1004 may implement a radio technology such as Evolved UMTS Terrestrial Radio Access (E-UTRA), which may establish air interface 1014 using LTE or LTE-Advanced (LTE-A).

Optionally base station 1016 and WTRUs 1002 connected to RAN 1004 may implement radio technologies such as IEEE 602.13 (i.e., Worldwide Interoperability for Microwave Access (WiMAX), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 1016 may be a wireless router, Home Node B, Home eNode B, or access point, for example, and may utilize any suitable RAT for facilitating wireless connectivity in a localized area, such as a place of business, a home, a vehicle, a campus, or the like. For example, base station 1016 and associated WTRUs 1002 may implement a radio technology such as IEEE 602.11 to establish a wireless local area network (WLAN). As another example, base station 1016 and associated WTRUs 1002 may implement a radio technology such as IEEE 602.15 to establish a wireless personal area network (WPAN). In yet another example, base station 1016 and associated WTRUs 1002 may utilize a cellular-based RAT (e.g., WCDMA, CDMA2000, GSM, LTE, LTE-A, etc.) to establish a picocell or femtocell. As shown in FIG. 10, base station 1016 may have a direct connection to Internet 1010. Thus, base station 1016 may not be required to access Internet 1010 via core network 1006.

RAN 1004 may be in communication with core network 1006, which may be any type of network configured to provide voice, data, applications, and/or voice over internet protocol (VoIP) services to one or more WTRUs 1002. For example, core network 1006 may provide call control, billing services, mobile location-based services, pre-paid calling. Internet connectivity, video distribution or high-level security functions, such as user authentication. Although not shown in FIG. 10, it will be appreciated that RAN 1004 or core network 1006 may be in direct or indirect communication with other RANs that employ the same RAT as RAN 1004 or a different RAT. For example, in addition to being connected to RAN 1004, which may be utilizing an E-UTRA radio technology, core network 1006 may also be in communication with another RAN (not shown) employing a GSM radio technology.

Core network 1006 may also serve as a gateway for WTRUs 1002 to access PSTN 1008, Internet 1010, or other networks 1012. PSTN 1008 may include circuit-switched telephone networks that provide plain old telephone service (POTS). For LTE core networks, core network 1006 may use IMS core 1014 to provide access to PSTN 1008. Internet 1010 may include a global system of interconnected computer networks or devices that use common communication protocols, such as the transmission control protocol (TCP), user datagram protocol (UDP), or IP in the TCP/IP internet protocol suite. Other networks 1012 may include wired or wireless communications networks owned or operated by other service providers. For example, other networks 1012 may include another core network connected to one or more RANs, which may employ the same RAT as RAN 1004 to a different RAT.

Some or all WTRUs 1002 in telecommunication system 1000 may include multi-mode capabilities. That is, WTRUs 1002 may include multiple transceivers for communicating with different wireless networks over different wireless links. For example, one or more WTRUs 1002 may be configured to communicate with base station 1016, which may employ a cellular-based radio technology, and with base station 1016, which may employ an IEEE 802 radio technology.

Figure 11:
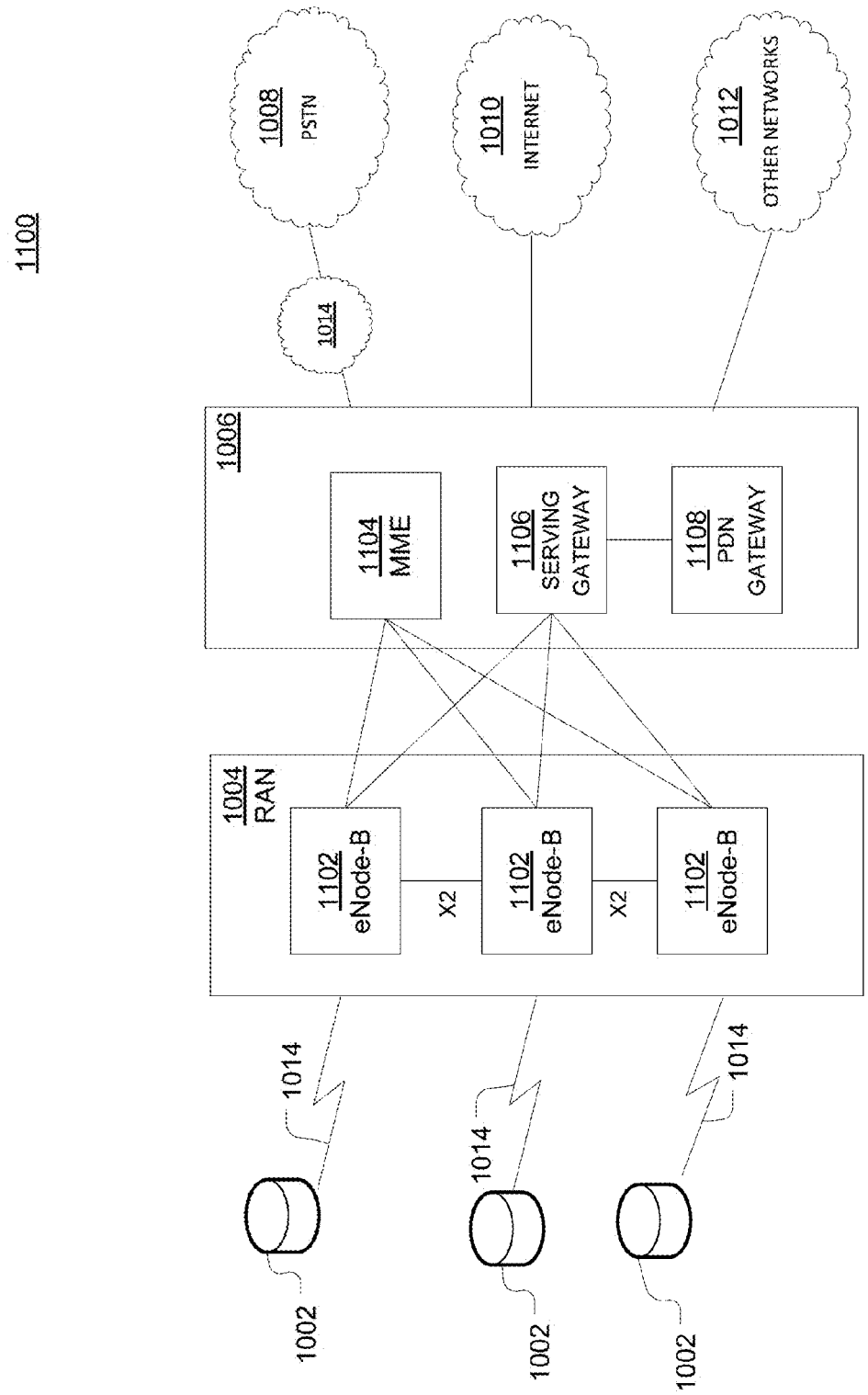
FIG. 11 is an example system diagram of a radio access network and a core network.

FIG. 11 is an example system 1100 including RAN 1004 and core network 1006. As noted above, RAN 1004 may employ an E-UTRA radio technology to communicate with WTRUs 1002 over air interface 1014. RAN 1004 may also be in communication with core network 1006.

RAN 1004 may include any number of eNode-Bs 1102 while remaining consistent with the disclosed technology. One or more eNode-Bs 1102 may include one or more transceivers for communicating with the WTRUs 1002 over air interface 1014. Optionally, eNode-Bs 1102 may implement MIMO technology. Thus, one of eNode-Bs 1102, for example, may use multiple antennas to transmit wireless signals to, or receive wireless signals from, one of WTRUs 1002.

Each of eNode-Bs 1102 may be associated with a particular cell (not shown) and may be configured to handle radio resource management decisions, handover decisions, scheduling of users in the uplink or downlink, or the like. As shown in FIG. 11 eNode-Bs 1102 may communicate with one another over an X2 interface.

Core network 1006 shown in FIG. 11 may include a mobility management gateway of entity (MME) 1104, a serving gateway 1106, or a packet data network (PDN) gateway 1108. While each of the foregoing elements are depicted as part of core network 1006, it will be appreciated that any one of these elements may be owned or operated by an entity other than the core network operator.

MME 1104 may be connected to each of eNode-Bs 1102 in RAN 1004 via an S1 interface and may serve as a control node. For example, MME 1104 may be responsible for authenticating users of WTRUs 1002, bearer activation or deactivation, selecting a particular serving gateway during an initial attach of WTRUs 1002, or the like. MME 1104 may also provide a control plane function for switching between RAN 1004 and other RANs (not shown) that employ other radio technologies, such as GSM or WCDMA.

Serving gateway 1106 may be connected to each of eNode-Bs 1102 in RAN 1004 via the S1 interface. Serving gateway 1106 may generally route or forward user data packets to or from the WTRUs 1002. Serving gateway 1106 may also perform other functions, such as anchoring user planes during inter-eNode-B handovers, triggering paging when downlink data is available for WTRUs 1002, managing or storing contexts of WTRUs 1002, or the like.

Serving gateway 1106 may also be connected to PDN gateway 1108, which may provide WTRUs 1002 with access to packet-switched networks, such as Internet 1010, to facilitate communication between WTRUs 1002 and IP-enabled devices.

Core network 1006 may facilitate communications with other networks. For example, core network 1006 may provide WTRUs 1002 with access to circuit-switched networks, such as PSTN 1008, such as through IMS core 1014, to facilitate communications between WTRUs 1002 and traditional land-line communications devices. In addition, core network 1006 may provide the WTRUs 1002 with access to other networks 1012, which may include other wired or wireless networks that are owned or operated by other service providers.

Figure 12:
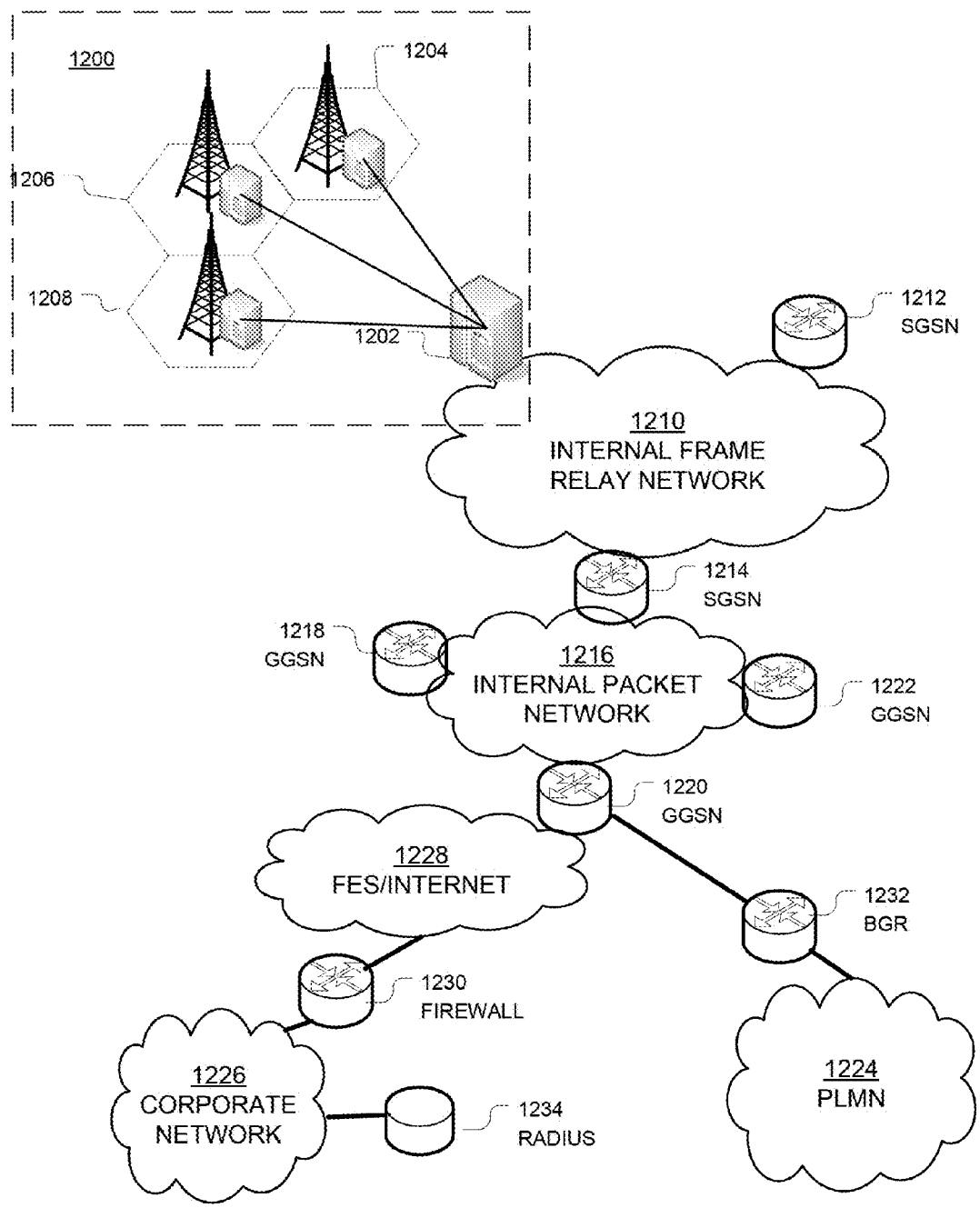
FIG. 12 depicts an overall block diagram of an example packet-based mobile cellular network environment, such as a general packet radio service (GPRS) network.

FIG. 12 depicts an overall block diagram of an example packet-based mobile cellular network environment, such as a GPRS network as described herein. In the example packet-based mobile cellular network environment shown in FIG. 12, there are a plurality of base station subsystems (BSS) 1200 (only one is shown), each of which comprises a base station controller (BSC) 1202 serving a plurality of BTSs 1204, 1206, 1208. BTSs 1204, 1206, 1208 are the access points where users of packet-based mobile devices become connected to the wireless network. In example fashion, the packet traffic originating from mobile devices is transported via an over-the-air interface to BTS 1208, and from BTS 1208 to BSC 1202. Base station subsystems, such as BSS 1200, are a part of internal frame relay network 1210 that can include a service GPRS support nodes (SGSN), such as SGSN 1212 or SGSN 1214. Each SGSN 212, 1214 is connected to an internal packet network 1216 through which SGSN 1212, 1214 can route data packets to or from a plurality of gateway GPRS support nodes (GGSN) 1218, 1220, 1222. As illustrated, SGSN 1214 and GGSNs 1218, 1220,1222 are part of internal packet network 1216. GGSNs 1218, 1220, 1222 mainly provide an interface to external IP networks such as PLMN 1224, corporate intranets/internets 1226, or Fixed-End System (FES) or the public Internet 1228. As illustrated, subscriber corporate network 1226 may be connected to GGSN 1220 via a firewall 1230. PLMN 1224 may be connected to GGSN 1220 via a boarder gateway router (BGR) 1232. A Remote Authentication Dial-In-User Service (RADIUS) server 1234 may be used for caller authentication when a user calls corporate network 1226.

Generally, ther may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 13:
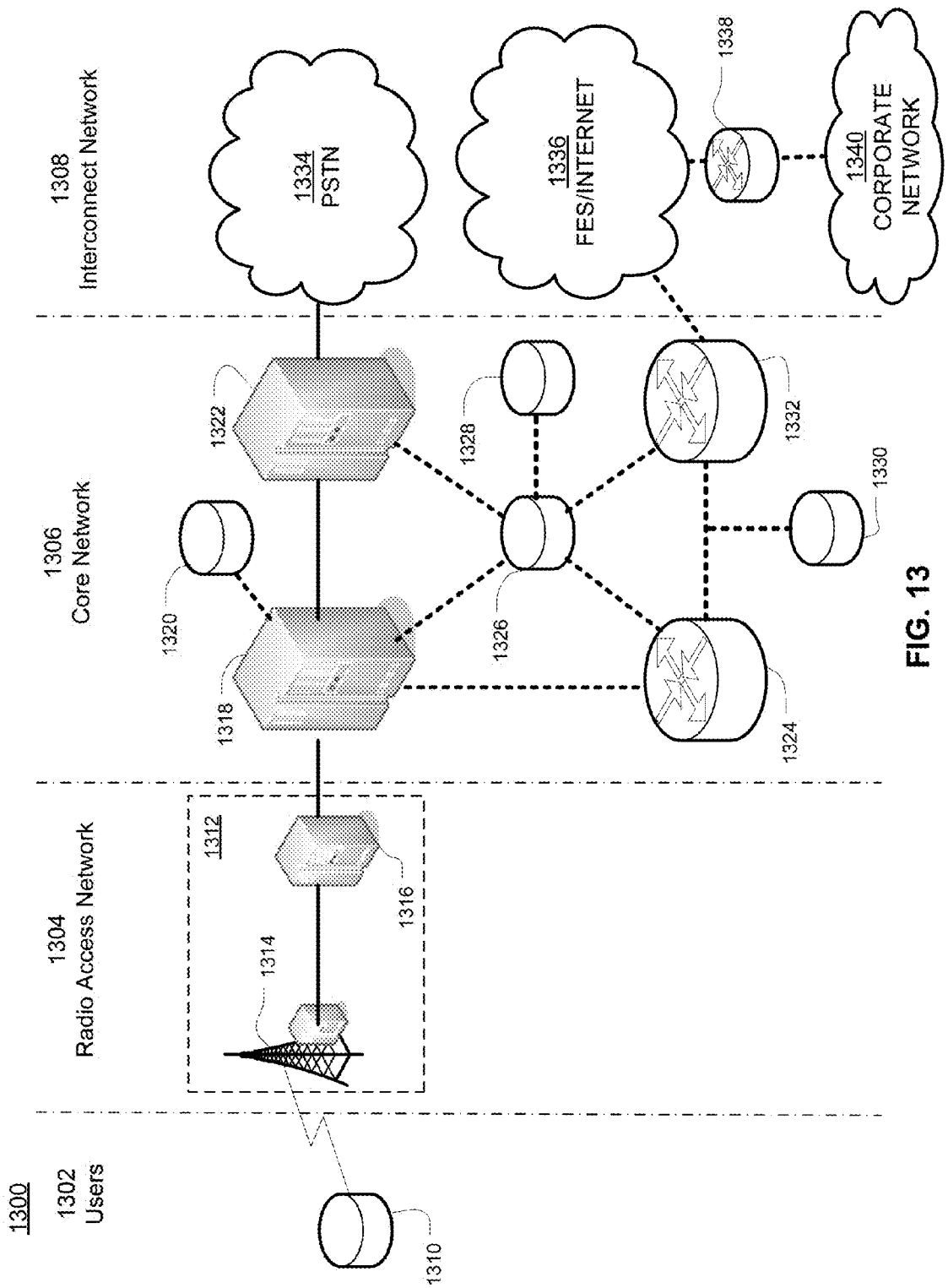
FIG. 13 illustrates an exemplary architecture of a GPRS network.

FIG. 13 illustrates an architecture of a typical GPRS network 1300 as described herein. The architecture depicted in FIG. 13 may be segmented into four groups: users 1302, RAN 1304, core network 1306, and interconnect network 1308. Users 1302 comprise a plurality of end users, who each may use one or more devices 110. Note that device 1310 is referred to as a mobile subscriber (MS) in the description of network shown in FIG. 13. In an example, device 1310 comprises a communications device (e.g. server 102, client 108, network device 700, any of detected devices 1300, second device 1308, access device 1004, access device 1006, access device 1008, access device 1010 or the like, or any combination thereof). Radio access network 1304 comprises a plurality of BSSs such as BSS 1312, which includes a BTS 1314 and a BSC 1316. Core network 1306 may include a host of various network elements. As illustrated in FIG. 13, core network 1306 may comprise MSC 1318, service control point (SCP) 1320, gateway MSC (GMSC) 1322, SGSN 1324, home location register (HLR) 1326, authentication center (AuC) 1328, domain name system (DNS) server 1330, and GGSN 1332. Interconnect network 1308 may also comprise a host of various networks or other network elements. As illustrated in FIG. 13, interconnect network 1308 comprises a PSTN 1334, an FES/Internet 1336, a firewall 1038, or a corporate network 1340.

An MSC can be connected to a large number of BSCs. At MSC 1318, for instance, depending on the type of traffic, the traffic may be separated in that voice may be sent to PSTN 1334 through GMSC 1322, or data may be sent to SGSN 1324, which then sends the data traffic to GGSN 1332 for further forwarding.

When MSC 1318 receives call traffic, for example, from BSC 1316, it sends a query to a database hosted by SCP 1320, which processes the request and issues a response to MSC 1318 so that it may continue call processing as appropriate.

HLR 1326 is a centralized database for users to register to the GPRS network. HLR 1326 stores static information about the subscribers such as the International Mobile Subscriber Identity (IMSI), subscribed services, or a key for authenticating the subscriber. HLR 1326 also stores dynamic subscriber information such as the current location of the MS. Associated with HLR 1326 is AuC 1328, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 13, when MS 1310 initiates the attach process by turning on the network capabilities of the mobile device, an attach request is sent by MS 1310 to SGSN 1324. The SGSN 1324 queries another SGSN, to which MS 1310 was attached before, for the identity of MS 1310. Upon receiving the identity of MS 1310 from the other SGSN, SGSN 1324 requests more information from MS 1310. This information is used to authenticate MS 1310 together with the information provided by HLR 1326. Once verified, SGSN 1324 sends a location update to HLR 1326 indicating the change of location to a new SGSN, in this case SGSN 1324. HLR 1326 notifies the old SGSN, to which MS 1310 was attached before, to cancel the location process for MS 1310. HLR 1326 then notifies SGSN 1324 that the location update has been performed. At this time, SGSN 1324 sends an Attach Accept message to MS 1310, which in turn sends an Attach Complete message to SGSN 1324.

Next, MS 1310 establishes a user session with the destination network, corporate network 1340, by going through a Packet Data Protocol (PDP) activation process. Briefly, in the process, MS 1310 requests access to the Access Point Name (APN), for example, UPS.com, and SGSN 1324 receives the activation request from MS 110. SGSN 1324 then initiates a DNS query to learn which GGSN 1332 has access to the UPS.com APN. The DNS query is sent to a DNS server within core network 1306, such as DNS server 1330, which is provisioned to map to one or more GGSNs in core network 1306. Based on the APN, the mapped GGSN 1332 can access requested corporate network 1340. SGSN 1324 then sends to GGSN 1332 a Create DPD Context Request message that contains necessary information. GGSN 1332 sends a Create DPD Context Response message to SGSN 1324, which then sends an Activate PDP Context Accept message to MS 1310.

Once activated, data packets of the call made by MS 1310 can then go through RAN 1304, core network 1306, and interconnect network 1308, in a particular FES/Internet 1336 and firewall 1038, to reach corporate network 1340.

Figure 14:
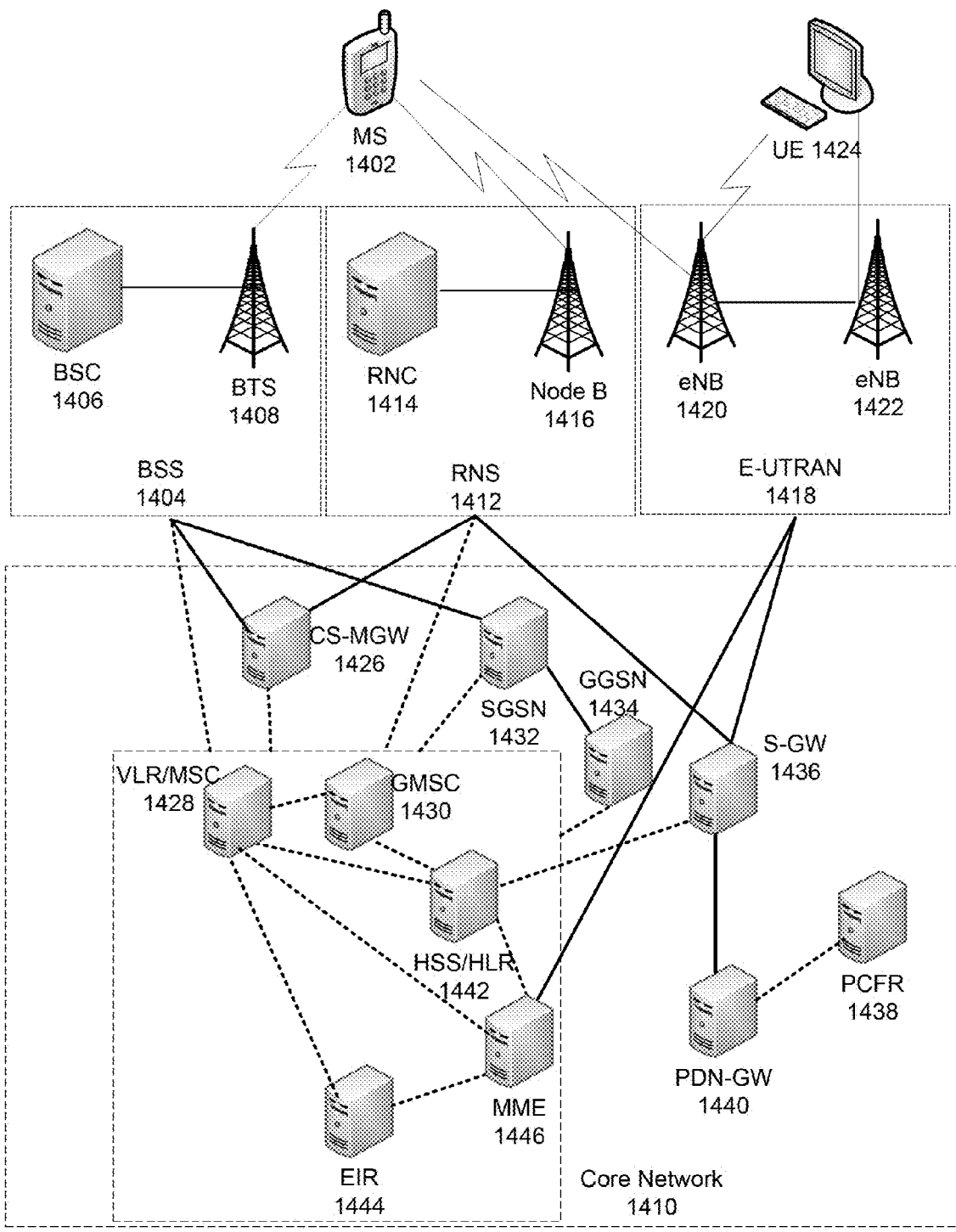
FIG. 14 is a block diagram of an exemplary public land mobile network (PLMN).

FIG. 14 illustrates a PLMN block diagram view of an example architecture that may be replaced by a telecommunication system. In FIG. 14, solid lines may represent user traffic signals, and dashed lines may represent support signaling. MS 1402 is the physical equipment used by the PLMN subscriber. For example, client 108, server 102, the like, or any combination thereof may serve as MS 1402. MS 1402 may be one of, but not limited to, a cellular telephone, a cellular telephone in combination with another electronic device or any other wireless mobile communication device.

MS 1402 may communicate wirelessly with BSS 1404. BSS 1404 contains BSC 1406 and a BTS 1408. BSS 1404 may include a single BSC 1406/BTS 1408 pair (base) station) or a system of BSC/BTS pairs that are part of a larger network. BSS 1404 is responsible for handling cellular traffic and signaling between MS 1402 and a core network 1410. Typically, BSS 1404 performs functions that include, but are not limited to, digital conversion of speech channels, allocation of channels to mobile devices, paging, or transmission/reception of cellular signals.

Additionally, MS 1402 may communicate wirelessly with RNS 1412. RNS 1412 contains a Radio Network Controller (RNC) 1414 and one or more Nodes B 1416. RNS 1412 may support one or more cells. RNS 1412 may also include one or more RNC 1414/Node B 1416 pairs or alternatively a single RNC 1414 may manage multiple Nodes B 1416. RNS 1412 is responsible for communicating with MS 1402 in its geographically defined area. RNC 1414 is responsible for controlling Nodes B 1416 that are connected to it and is a control element in a UMTS radio access network. RNC 1414 performs functions such as, but not limited to, load control, packet scheduling, handover control, security functions, or controlling MS 1402 access to core network 1410.

An E-UTRA Network (E-UTRAN) 1418 is a RAN that provides wireless data communications for MS 1402 and UE 1424. E-UTRAN 1418 provides higher data rates than traditional UMTS. It is part of the LTE upgrade for mobile networks, and later releases meet the requirements of the International Mobile Telecommunications (IMT) Advanced and are commonly known as a 4G networks. E-TRAN 1418 may include of series of logical network components such as E-TRAN Node B (eNB) 1420 and E-UTRAN Node B (eNB) 1422. E-UTRAN 1418 may contain one or more eBs. User equipment (UE) 1424 may be any mobile device capable of connecting to E-TRAN 1418 including, but not limited to, a personal computer, laptop, mobile device, wireless router, or other device capable of wireless connectivity to E-UTRAN 1418. The improved performance of the E-UTRAN 1418 relative to a typical UMTS network allows for increased bandwidth, spectral efficiency, and functionality including, but not limited to, voice, high-speed applications, large data transfer or IPTV, while still allowing for full mobility.

Typically MS 1402 may communicate with any or all of BSS 1404, RNS 1412, or E-UTRAN 1418. In a illustrative system, each of BSS 1404, RNS 1412, and E-UTRAN 1418 may provide MS 1402 with access to core network 1410. Core network 1410 may include of a series of devices that route data and communications between end users. Core network 1410 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1426 is part of core network 1410, and interacts with VLR/MSC server 1428 and GMSC server 1430 in order to facilitate core network 1410 resource control in the CS domain. Functions of CS-MGW 1426 include, but are not limited to, media conversion, bearer control, payload processing or other mobile network processing such as handover or anchoring. CS-MGW 1426 may receive connections to MS 1402 through BSS 1404 or RNS 1412.

SGSN 1432 stores subscriber data regarding MS 1402 in order to facilitate network functionally. SGSN 1432 may store subscription information such as, but not limited to, the IMSI, temporary identities, or PDP addresses, SGSN 1432 may also store location information such as, but not limited to, GGSN address for each GGSN 1434 where an active PDP exists. GGSN 1434 may implement a location register function to store subscriber data it receives from SGSN 1432 such as subscription or location information.

Serving gateway (S-GW) 1436 is an interface which provides connectivity between E-UTRAN 1418 and core network 1410. Functions of S-GW 1436 include, but are not limited to, packet routing, packet forwarding, transport level packet processing, or user plane mobility anchoring for inter-network mobility. PCRF 1438 uses information gathered from P-GW 1436, as well as other sources, to make applicable policy and charging decisions related to data flows, network resources or other network administration functions. PDN gateway (PDN-GW) 1440 may provide user-to-services connectivity functionality including, but not limited to, GPRS/EPC network anchoring, bearer session anchoring and control, or IP address allocation for PS domain connections.

HSS 1442 is a database for user information and stores subscription data regarding MS 1402 or UE 1424 for handling calls or data sessions. Networks may contain one HSS 1442 or more if additional resources are required. Example data stored by HSS 1442 include, but is not limited to, user identification, numbering or addressing information, security information, or location information. HSS 1442 may also provide call or session establishment procedures in both the PS and CS domains.

VLR/MSC Server 1428 provides user location functionality. When MS 1402 enters a new network location, it begins a registration procedure. A MSC server for that location transfers the location information to the VLR for the area. A VLR and MSC server may be located in the same computing environment, as is shown by VLR/MSC server 1428, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1402 registration or procedures for handover of MS 1402 to a different section of core network 1410. GMSC server 1430 may serve as a connection to alternate GMSC servers for other MSs in larger networks.

EIR 1444 is a logical element which may store the IMEI for MS 1402. User equipment may be classified as either "white listed" or "black listed" depending on its status in the network. If MS 1402 is stolen and put to use by an unauthorized user, it may be registered as 'black listed' in EIR 1444, preventing its use on the network. A MME 1446 is a control node which may track MS 1402 or UE 1424 if the devices are idle. Additional functionality may include the ability of MME 1446 to contact idle MS 1402 or Ue 1424 if retransmission of a previous session is required.

As described therein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodies in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed:

1. An apparatus comprising:
    a processor; and
    memory coupled to the processor, the memory comprising executable instructions that cause the processor to effectuate operations comprising:
        encoding a file into a plurality n of chunks, wherein a subset k of the n chunks are used to create a functional equivalent of the file and k<n;
        creating at least one additional chunk d from the plurality of n chunks, wherein k of the n chunks and the at least one additional chunk d is used to create the functional equivalent of the file, wherein d is greater than or equal to one;
        directing the at least one additional chunk d to be stored only in a cache memory and the n chunks to be stored only in non-cache memory on at least one storage node;
        upon demand for the file, causing the at least one additional chunk d to be retrieved from the cache memory and at least one of the n chunks from the non-cache memory; and
        constructing the functional equivalent of the file through utilization of the at least one additional chunk d and the at least one of the n chunks.

2. The apparatus of claim 1, wherein the non-cache memory comprises
    at least one storage node.

3. The apparatus of claim 2, wherein the at least one storage node comprises a plurality of storage nodes and the operation of directing comprises:
    utilizing the n chunks to create the d chunks, wherein d>1;
    directing each of the d chunks to be stored in the cache memory; and
    directing each of the n chunks to be stored on one of the storage nodes.

4. The apparatus of claim 3, wherein the operation of causing comprises requesting each one of the storage nodes to transmit a respective one of the n chunks.

5. The apparatus of claim 4, wherein the operation of constructing comprises constructing the functional equivalent upon receipt of a sufficient number of the n chunks and d chunks to create the functional equivalent of the file.

6. The apparatus of claim 1, wherein the operation of encoding comprises encoding the file through employment of a maximum distance separable (MDS) erasure code to create a (n, k) erasure code.

7. The apparatus of 6, wherein the operations further comprise:
    using the d chunk(s) to create a (n+d, k) erasure code.

8. The apparatus of claim 7, wherein the operations further comprise:
    receiving d chunks from the cache; and
    receiving k-d chunks from the at least one storage node.

9. The apparatus of claim 1, wherein the operations further comprise:
    receiving a plurality of requests for the file;
    calculating a rate at which the plurality of requests have been received;
    using the rate in a determination to run a cache optimization routine.

10. The apparatus of claim 1, wherein creating is based on an output of the cache optimization routine.

11. A method operating on a server device comprising:
    encoding a file into a plurality n of chunks, wherein a subset k of the n chunks are used to create a functional equivalent of the file and k<n;
    creating at least one additional chunk d from the plurality of n chunks, wherein k of the n chunks and the at least one additional chunk d is used to create the functional equivalent of the file, wherein d is greater than or equal to one;
    directing the at least one additional chunk d to be stored only in a cache memory and the n chunks to be stored only in non-cache memory on at least one storage node;
    upon demand for the file, causing the at least one additional chunk d to be retrieved from the cache memory and at least one of the n chunks from the non-cache memory; and
    constructing the functional equivalent of the file through utilization of the at least one additional chunk d and the at least one of the n chunks.

12. The method of claim 11, further comprising:
    upon demand for the file, causing the at least one of the n chunks to be retrieved from the at least one storage node.

13. The method of claim 12, wherein the at least one storage node comprises a plurality of storage nodes and the step of directing comprises:
    utilizing the n chunks to create the d chunks, wherein d>1;
    directing each of the d chunks to be stored in the cache memory; and directing each of the n chunks to be stored on one of the storage nodes.

14. The method of claim 13, wherein the step of causing comprises requesting each one of the storage nodes to transmit a respective one of the n chunks.

15. The method of claim 14, wherein the step of constructing comprises constructing the functional equivalent upon receipt of a sufficient number of the n chunks and d chunks to create the functional equivalent of the file.

16. The method of claim 11, wherein the step of encoding comprises encoding the file through employment of a maximum distance separable (MDS) erasure code to create a (n, k) erasure code.

17. The method of claim 16, further comprising:
using the the d chunk(s) to create a (n+d, k) erasure code.

18. The method of claim 17, further comprising:
receiving d chunks from the cache; and
receiving k-d chunks from the at least one storage node.

19. The method of claim 11, further comprising:
receiving a plurality of requests for the file;
calculating a rate at which the plurality of requests have been received;
using the rate in a determination to run a cache optimization routine.

20. The method of claim 11, wherein the step of creating is based on an output of the cache optimization routine.

* * * * *

UNITED STATES PATENT AND TRADEMARK OFFICE
CERTIFICATE OF CORRECTION

PATENT NO. : 10,547,681 B2
APPLICATION NO. : 15/199475
DATED : January 28, 2020
INVENTOR(S) : Yu Xiang et al.

Page 1 of 1

It is certified that error appears in the above-identified patent and that said Letters Patent is hereby corrected as shown below:

In the Specification

Column 1, Line 3, add under the heading GOVERNMENT RIGHTS the following paragraph:
-- This invention was made with government support under Grant No. 1618628 awarded by the National Science Foundation. The government has certain rights in the invention. --.

In the Claims

Claim 3, Column 28, Line 7, after "create" delete "the".

Signed and Sealed this
Twentieth Day of October, 2020

Andrei Iancu
*Director of the United States Patent and Trademark Office*